(12) United States Patent
Choi et al.

(10) Patent No.: US 10,381,625 B2
(45) Date of Patent: Aug. 13, 2019

(54) COMPOSITE MEMBRANE, PREPARATION METHOD THEREOF, ANODE STRUCTURE INCLUDING THE COMPOSITE MEMBRANE, AND LITHIUM SECONDARY BATTERY INCLUDING THE ANODE STRUCTURE

(71) Applicant: Samsung Electronics Co., Ltd., Suwon-si, Gyeonggi-do (KR)

(72) Inventors: Wonsung Choi, Yongin-si (KR); Dongmin Im, Seoul (KR); Soonchul Kwon, Hwaseong-si (KR); Sungcheol Kim, Goyang-si (KR); Taeyoung Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 603 days.

(21) Appl. No.: 14/645,544

(22) Filed: Mar. 12, 2015

(65) Prior Publication Data
US 2016/0181585 A1     Jun. 23, 2016

(30) Foreign Application Priority Data

Dec. 19, 2014   (KR) .......................... 10-2014-0184964

(51) Int. Cl.
*H01M 2/16*   (2006.01)
*H01M 2/14*   (2006.01)
(Continued)

(52) U.S. Cl.
CPC ......... *H01M 2/1686* (2013.01); *H01M 2/145* (2013.01); *H01M 2/16* (2013.01); *H01M 2/166* (2013.01); *H01M 2/1646* (2013.01); *H01M 2/1653* (2013.01); *H01M 2/18* (2013.01); *H01M 8/0247* (2013.01); *H01M 10/052* (2013.01); *H01M 12/08* (2013.01); *H01M 2220/20* (2013.01)

(58) Field of Classification Search
None
See application file for complete search history.

(56) References Cited

U.S. PATENT DOCUMENTS 7,282,295 B2   10/2007  Visco et al.
7,638,241 B2   12/2009  Lee et al.
(Continued)

FOREIGN PATENT DOCUMENTS

CN   101326658 A   12/2008
CN   103108689 A    5/2013
(Continued)

OTHER PUBLICATIONS

Kiesow et al, Bicontinuous Zeolite Polymer Composite Membranes Prepared via Float Casting, l J. Am. Chem. Soc. 2013, 135, 4380-4388 (Feb. 2013).*
(Continued)

*Primary Examiner* — Yoshitoshi Takeuchi
(74) *Attorney, Agent, or Firm* — Cantor Colburn LLP

(57) ABSTRACT

A composite membrane includes: an organic layer having a plurality of through holes; and ion conductive inorganic particles disposed in the through holes, wherein a hydrophobic coating layer is disposed on a surface of the ion conductive inorganic particles.

35 Claims, 11 Drawing Sheets

(51) Int. Cl.
  *H01M 12/08*   (2006.01)
  *H01M 10/052*  (2010.01)
  *H01M 8/0247*  (2016.01)
  *H01M 2/18*    (2006.01)

(56) References Cited

U.S. PATENT DOCUMENTS

| | | | |
|---|---|---|---|
| 7,691,536 | B2 | 4/2010 | Johnson |
| 7,767,345 | B2 | 8/2010 | Imagawa et al. |
| 7,998,622 | B2 | 8/2011 | Inda |
| 8,148,436 | B2 | 4/2012 | Capron et al. |
| 8,822,077 | B2 | 9/2014 | Katoh |
| 2006/0166085 | A1 | 7/2006 | Hennige et al. |
| 2007/0231704 | A1 | 10/2007 | Inda |
| 2008/0070087 | A1 | 3/2008 | Johnson |
| 2008/0292968 | A1* | 11/2008 | Lee .................. H01M 2/14 429/247 |
| 2011/0059355 | A1 | 3/2011 | Zhang et al. |
| 2011/0129739 | A1 | 6/2011 | Nakanishi |
| 2011/0223494 | A1 | 9/2011 | Feaver et al. |
| 2012/0077084 | A1 | 3/2012 | Christensen et al. |
| 2012/0077095 | A1 | 3/2012 | Roumi et al. |
| 2013/0109262 | A1 | 5/2013 | Zhou |
| 2013/0149587 | A1* | 6/2013 | Yu .................. H01M 2/145 429/144 |
| 2013/0330639 | A1 | 12/2013 | Lee et al. |
| 2014/0227593 | A1 | 8/2014 | Lee et al. |
| 2014/0234733 | A1 | 8/2014 | Roev et al. |
| 2015/0079485 | A1 | 3/2015 | Choi et al. |
| 2015/0086714 | A1 | 3/2015 | Yu et al. |
| 2015/0255767 | A1* | 9/2015 | Aetukuri ............ H01M 8/1048 429/249 |
| 2016/0181585 | A1 | 6/2016 | Choi et al. |
| 2018/0254447 | A1 | 9/2018 | Lee et al. |

FOREIGN PATENT DOCUMENTS

| | | |
|---|---|---|
| CN | 104094447 A | 10/2014 |
| EP | 1496561 A2 | 1/2005 |
| JP | 10334890 A | 12/1998 |
| JP | 2007311151 A | 11/2007 |
| JP | 2008084708 A | 4/2008 |
| JP | 2008277170 A | 11/2008 |
| JP | 2014067632 A | 4/2014 |
| KR | 1020090052556 A | 5/2009 |
| KR | 1020120063163 A | 6/2012 |
| KR | 1020120124239 A | 11/2012 |
| KR | 1020130034928 A | 4/2013 |
| KR | 1020130112314 A | 10/2013 |
| WO | 2007066967 A1 | 6/2007 |
| WO | 2014035753 A1 | 3/2014 |

OTHER PUBLICATIONS

Kiesow et al., "Bicontinuous Zeolite Polymer Composite Membranes Prepared via Float Casting", Journal of the American Chemical Society, 2013, 135 (11), pp. 4380-4388.

Liang et al., "Preparation and electrochemical characterization of ionic-conducting lithium lanthanum titanate oxide/polyacrylonitrile submicron composite fiber-based lithium-ion battery separators", Journal of Power Sources, vol. 196, 2011, pp. 436-441.

Morgenstern et al., "Ag-nanowire films coated with ZnO nanoparticles as a transparent electrode for solar cells", Applied Physics Letters, vol. 99, 2011, pp. 183307-1-183307-3.

Popall et al., "Inorganic-Organic Copolymers as solid state Ionic conductors with Grafted Anions", Electrochimica Acta, vol. 40, No. 13-14, 1995, pp. 2305-2308.

Shen et al., "Physicochemical properties of poly(ethylene oxide)-based composite polymer electrolytes with a silane-modified mesoporous silica SBA-15", Electrochimica Acta, vol. 54, 2009, pp. 3490-3494.

European Search Report for European Patent Application No. 15158759.9 dated Jun. 8, 2016.

Office Action issued by the Chinese Patent Office dated Oct. 9, 2018, in the examination of the Chinese Patent Application No. 201510108580.0.

Office Action issued by the Japanese Patent Office dated Apr. 1, 2019 in the examination of the Japanese Patent Application No. 2015-49946, which corresponds to U.S. Appl. No. 14/645,544.

\* cited by examiner

COMPOSITE MEMBRANE, PREPARATION METHOD THEREOF, ANODE STRUCTURE INCLUDING THE COMPOSITE MEMBRANE, AND LITHIUM SECONDARY BATTERY INCLUDING THE ANODE STRUCTURE

CROSS REFERENCE TO RELATED APPLICATION

This application claims priority to and the benefit of Korean Patent Application No. 10-2014-0184964, filed on Dec. 19, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a composite membrane, a preparation method thereof, an anode structure including the composite membrane, and a lithium secondary battery including the anode structure.

2. Description of the Related Art

Lithium air batteries include an anode able to intercalate/deintercalate lithium ions, a cathode including oxygen as a cathode active material and an oxygen redox catalyst, and a lithium-ion conductive medium between the cathode and the anode.

Lithium air batteries have a theoretical energy density of about 3,000 Wh/kg or more, which is relatively higher than that of lithium-ion batteries. In addition, lithium air batteries are environmentally friendly and are safer than lithium-ion batteries. In order to improve the cell performance of lithium air batteries, there remains a need for materials having improved characteristics.

SUMMARY

Provided is a composite membrane and preparation methods thereof.

Provided is an anode structures including the composite membrane.

Provided is a lithium secondary battery having improved cell performance.

Additional aspects will be set forth in part in the description which follows and, in part, will be apparent from the description.

According to an aspect, a composite membrane includes: an organic layer having a plurality of through holes; and ion conductive inorganic particles disposed in the through holes, wherein a hydrophobic coating layer is disposed on a surface of the ion conductive inorganic particles.

According to an aspect of another embodiment, a method of preparing a composite membrane includes: floating ion conductive inorganic particles having a hydrophobic coating layer disposed a surface thereof and a mixture including a polymerizable non-aqueous floating compound and a solvent on water to form a first system;
stirring the first system to form a second system;
removing the solvent from the second system to form a third system; and
polymerizing the third system to form the composite membrane.

The first operation may include: (a-1) first float casting to float a first portion of the polymerizable non-aqueous floating compound and the solvent on the water;
(a-2) second float casting to float the ion conductive inorganic particles on the water by providing the ion conductive inorganic particles having a hydrophobic coating layer formed thereon to the to the water having the polymerizable non-aqueous floating compound and the solvent thereon; and
(a-3) third float casting to float a second portion of the polymerizable non-aqueous floating compound and the solvent on the water by contacting the second portion to the product of the second floor casting.

According to an aspect of another embodiment, an anode structure includes an anode and the composite membrane.

According to an aspect of another embodiment, a lithium secondary battery includes the anode structure.

According to an aspect of another embodiment, a lithium air battery includes the anode structure.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
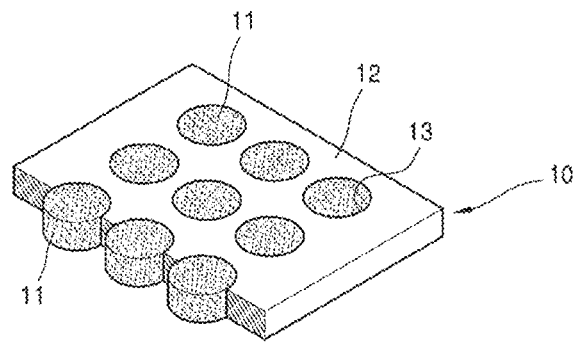
FIG. 1A is a schematic perspective view of an embodiment of a composite membrane.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Hereinafter, a composite membrane according to an embodiment of the present disclosure, a preparation method thereof, and a lithium air battery and a lithium secondary battery including the composite membrane will be disclosed in more detail.

Provided is a composite membrane which includes an organic layer having a plurality of through holes and ion conductive inorganic particles disposed in, e.g., formed in, the through holes, wherein a hydrophobic coating layer is disposed on, e.g., formed on, a surface of the ion conductive inorganic particles.

Since the hydrophobic coating layer is formed on the surface of the ion conductive inorganic particles, a polymerizable non-aqueous floating compound used in the formation of the organic layer is not present on a first surface and a second surface opposite to the first surface of the ion conductive inorganic particles during the preparation of the composite membrane. As a result, a finally obtained composite membrane may have a structure in which the ion conductive inorganic particles are exposed on a surface of the composite membrane. The expression "first surface" denotes an exposed surface of the ion conductive inorganic particle 23 disposed on a top surface of the composite membrane of FIG. 2, and the expression "second surface" denotes an exposed surface of the ion conductive inorganic particle 23 disposed on a bottom surface of the composite membrane of FIG. 2.

A hydrophobic coating layer is disposed on, e.g., formed on, a surface of the ion conductive inorganic particles, and the surface on which the hydrophobic coating layer is disposed is not exposed on the surface of the composite membrane. The surface of the ion conductive inorganic particles not exposed on the surface of the composite membrane may represent a third surface or a fourth surface of the ion conductive inorganic particle 23 in FIG. 2. In an embodiment, the surface of the ion conductive inorganic particles on which the hydrophobic coating layer is disposed faces a surface of the organic layer.

Since the hydrophobic coating layer is formed as described above, a phenomenon may be prevented in which the ion conductive inorganic particles are settled in water during the preparation of the composite membrane, the ion conductive inorganic particles are uniformly distributed in the composite membrane, and a robust composite membrane without having a space between the ion conductive inorganic particles and the organic layer may be obtained. Also, and while not wanting to be bound by theory, it is understood that covering of the entire surface of the composite membrane including a top of the hydrophobic coating layer with an organic layer material such as a polymer may be suppressed due to the formation of the hydrophobic coating layer.

The hydrophobic coating layer may be in a form of a continuous coating layer or a discontinuous coating layer to provide an island. When the hydrophobic coating layer is formed on the surface of the ion conductive inorganic particles as described above, adequate buoyancy in water may be provided.

The hydrophobic coating layer includes at least one condensation reaction product selected from compounds represented by Formula 1 below.

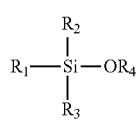

Formula 1

In Formula 1, $R_1$ to $R_3$ each independently represent at least one selected from a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_2$-$C_{20}$ heterocyclic group, and a halogen atom, and $R_4$ represents at least one selected from hydrogen, a substituted or unsubstituted $C_1$-$C_{20}$ alkyl group, and a substituted or unsubstituted $C_6$-$C_{20}$ aryl group.

$R_1$ to $R_3$, for example, may include at least one selected from methyl, ethyl, butyl, isobutyl, octyl, methoxy, ethoxy, octadecyl, 3-methacryloxypropyl, decyl, propyl, and chlorine.

$R_4$, for example, may include at least one selected from methyl, ethyl, butyl, propyl, isobutyl, and octyl.

The compound represented by Formula 1 may include at least one selected from isobutyltrimethoxysilane, octyltrimethoxysilane, propyltrimethoxysilane, decyltrimethoxysilane, dodecyltrimethoxysilane, octadecyltrimethoxysilane, 3-methacryloxypropyltrimethoxysilane, n-octadecyltriethoxysilane, 1H,1H,2H,2H-perfluorooctyltriethoxysilane, and (3-mercaptopropyl)trimethoxysilane. An amount of the condensation reaction product of the compound represented by Formula 1 in the hydrophobic coating layer may be in a range of about 0.1 part by weight to about 30 parts by weight, for example, about 0.1 part by weight to about 10 parts by weight, and specifically, about 0.1 part by weight to about 5 parts by weight, based on 100 parts by weight of the ion conductive inorganic particles.

The surface of the composite membrane may include a sea-island structure in which the ion conductive inorganic particles are discontinuously disposed in the continuous organic layer.

The cross section of the composite membrane may include a structure in which the organic layer and the ion conductive inorganic particles are alternately aligned.

The ion conductive inorganic particles embedded in the organic layer may be disposed in a monolayer.

The ion conductive inorganic particles may have a shape of a single-body particle without grain boundaries. Thus, grain boundaries are not observed in the ion conductive inorganic particles. The organic layer is a dense layer having non-porous characteristics.

The organic layer may be a polymer layer including at least one selected from a homopolymer, a block copolymer, and a random copolymer.

Figure 1B:
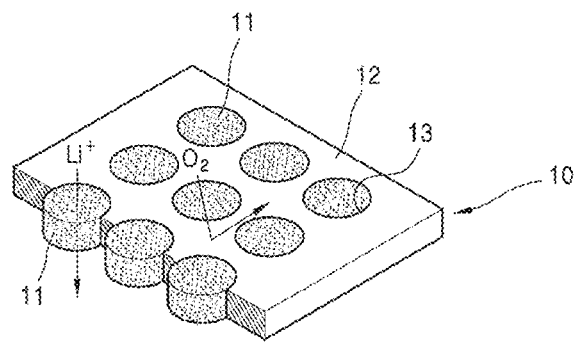
FIG. 1B is a schematic view for describing movement of lithium and blocking of oxygen in an embodiment of the composite membrane.

FIGS. 1A and 1B are perspective views schematically illustrating an embodiment of a structure of a composite membrane.

Referring to FIGS. 1A and 1B, a composite membrane 10 has a polymer layer 12, in which a plurality of through holes 13 are formed, and a structure in which ion conductive inorganic particles 11 are respectively inserted into the through holes 13 and combined therewith. The ion conductive inorganic particles 11 are particles that are hydrophobized by forming a hydrophobic coating layer (not shown) on a surface thereof. Herein, the hydrophobic coating layer may be in a form of a continuous coating layer, or in the form of a discontinuous coating layer such as an island. When the hydrophobic coating layer is formed on the surface of the ion conductive inorganic particles as described above, adequate buoyancy in water may be provided.

The ion conductive inorganic particles 11 has a structure of penetrating the polymer layer 12 and are disposed to be exposed to both sides of the composite membrane 10. Herein, a size of the through hole 13 is controlled according to a size of the ion conductive inorganic particle 11 during the preparation of the composite membrane.

When the composite membrane of FIG. 1B is used as a moisture or gas, such as oxygen and carbon dioxide, permeation barrier layer of a lithium air battery, ions (e.g., lithium ions) may pass through an ion-conductive region that is composed of the ion conductive inorganic particle 11 and a gas, such as oxygen and carbon dioxide, or moisture may be blocked by the polymer layer 12. Herein, the polymer layer 12 may include a polymer having properties that block moisture or gas such as oxygen and carbon dioxide.

As described above, the ion conductive inorganic particles 11 are exposed on a surface of the composite membrane 10. An exposed area of the ion conductive inorganic particles 11 is in a range of about 30% to about 80%, for example, about 40% to about 70%, based on a total area of the composite membrane. When the exposed area of the ion conductive inorganic particles is within the above range, a composite membrane having excellent ionic conductivity may be obtained.

In the composite membrane 10, the expression "thickness of an ion conductive inorganic particle" denotes a height difference between a top surface and a bottom surface of the ion conductive inorganic particle regardless of the shape of the ion conductive inorganic particle, and the ion conductive inorganic particles 11 and the polymer layer 12 have the same thickness. When the ion conductive inorganic particles and the polymer layer have the same thickness, binding of the composite membrane to other components may be facilitated, and thus, a binding force may be improved.

According to another embodiment of the present disclosure, it is also possible for the ion conductive inorganic particle and the polymer layer to have different thicknesses. For example, the thickness of the polymer layer is about 10 to about 200 μm, about 20 to about 150 μm, or about 90 micrometers (μm), and the thickness of the ion conductive inorganic particle is about 10 to about 200 μm, about 20 to about 150 μm, or about 95 μm.

The ion conductive inorganic particle 11 may form an ion-conductive region, and the polymer layer 12 may form a non-ionic conductive region. The ion-conductive region and the non-ionic conductive region are disposed to be in contact with each other in a thickness direction (e.g., a y-axis direction) of the composite membrane, and thus, a bicontinuous structure may be obtained.

The expression "bicontinuous structure" denotes a structure in which the ion conductive inorganic particles as one or more ion-conductive regions and the polymer layer as one or more non-ionic conductive regions are connected to one another through contact.

As illustrated in FIG. 1A, the ion conductive inorganic particles 11 may have the shape of a single-body particle without boundaries between particles.

Figure 2:
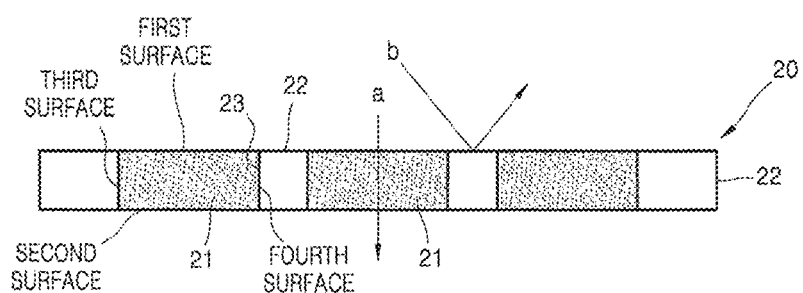
FIG. 2 illustrates a cross-section of the composite membrane illustrated in FIG. 1A.

FIG. 2 illustrates a cross-section of the composite membrane illustrated in FIG. 1A.

Referring to FIG. 2, when the composite membrane is used as an oxygen permeation barrier layer of a lithium air battery, ions (e.g., lithium ions) may pass through the ion-conductive region that comprises, or consists of, the ion conductive inorganic particle 21, as illustrated by "a" of FIG. 2, and gas, such as oxygen, or moisture may be blocked by the polymer layer 22, as illustrated by "b" of FIG. 2. Herein, the polymer layer 22 may include a polymer having properties that block moisture and gas such as oxygen and carbon dioxide.

The composite membrane may be used as a gas permeation inhibition layer of a lithium air battery, or as an anode protective layer of a lithium secondary battery.

The composite membrane according to the embodiment of the present disclosure has a gas permeability of about $10^{-3}$ $cm^3/m^2$ day to about 1,000 $cm^3/m^2$ day, about $20^{-3}$ $cm^3/m^2$ day to about 800 $cm^3/m^2$ day, or about $50^{-3}$ $cm^3/m^2$ day to about 600 $cm^3/m^2$ day. Herein, the term "gas" is used as a meaning including oxygen, carbon dioxide, water, and moisture.

In an embodiment, the composite membrane has a water permeability of about 0.001 to about 1 gram of water per square meter per day ($g_{water}/m^2 \cdot day$), or about 0.01 to about 0.5 $g_{water}/m^2 \cdot day$.

The ion conductive inorganic particles are not limited to shapes illustrated in FIGS. 1A, 1B, and 2. For example, the ion conductive inorganic particles may have any suitable shape, such as a cube, spherical, circular, elliptical, rod, square, or bar shape.

The size of the ion conductive inorganic particle represents an average diameter when the shape of the ion conductive inorganic particle is spherical. When the ion conductive inorganic particle has a different shape, the size of the ion conductive inorganic particle represents a length of a major axis.

Since the composite membranes 10 and 20 respectively have structures in which the ion conductive inorganic particles 11 and 21 respectively penetrate the polymer layers 12 and 22 from front surfaces thereof to back surfaces thereof, the ion conductive inorganic particles 11 and 21 may be exposed from both surfaces of the composite membranes 10 and 20. Thus, when a composite membrane has a structure in which ion conductive inorganic particles are exposed from both surfaces of the composite membrane, a movement path of lithium ions may be improved, and thus, the conductivity of the composite membrane may be improved.

In a lithium air battery, an ion conductive function and an oxygen barrier function are simultaneously performed by using a ceramic membrane. However, the ceramic membrane may be heavy, it may be difficult to prepare a large-sized ceramic membrane without fracture, and a shape of the ceramic membrane may be limited. Also, the mechanical strength of the ceramic material membrane may not only be insufficient, for example, the ceramic membrane may be easily broken by external impact, and there may also be a limitation in reducing the weight or thickness of the ceramic membrane. Thus, it may be difficult to commercialize the ceramic membrane.

In the disclosed composite membrane, since the ion conductive inorganic particles may be exposed from both surfaces of the composite membrane as illustrated in FIGS. 1A, 1B, and 2, a path through which ions move may be provided. Thus, the ionic conductivity of the composite membrane may be improved. Also, since the hydrophobic coating layer is formed on the at least one surface of the ion conductive inorganic particles, the dispersion of the ion conductive inorganic particles in the composite membrane may be improved and it may be easier to form a structure in which the ion conductive inorganic particles are exposed from the surfaces of the finally obtained composite membrane. Furthermore, when compared with a ceramic membrane, since the composite membrane may be formed as a thin film, the resistance thereof may be decreased and a lightweight and large-sized composite membrane may also be readily prepared. In addition, since the composite membrane includes a polymer, the flexibility thereof may be excellent. Thus, cell design may not only be flexible because the composite membrane may be processed as desired, but the mechanical strength thereof may also be excellent.

In a case where the composite membrane includes a polymer that has properties of blocking water or moisture and gas, such as oxygen and carbon dioxide, according to an embodiment of the present disclosure, the composite membrane may have an excellent ability to block water or moisture and gas. Therefore, the composite membrane may be prepared at a lower cost than the ceramic membrane, and when the composite membrane is used, a large-sized, thin, and lightweight battery may be prepared and a preparation process may be simplified. Also, a lithium secondary battery having improved lifetime may be prepared when the composite membrane is used.

According to another aspect of the present disclosure, provided is a composite membrane including an ion-conductive region and a non-ionic conductive region and having a bicontinuous structure, in which the ion-conductive region and the non-ionic conductive region are disposed to be in contact with each other in a thickness direction (e.g., a y-axis direction) of the composite membrane, wherein the ion-conductive region includes ion conductive inorganic particles having a hydrophobic coating layer formed on a surface thereof and the non-ionic conductive region includes a polymer. Herein, the ion conductive inorganic particles may have the shape of a single-body particle without grain boundaries.

Since the ion conductive inorganic particles are exposed from the surfaces of the composite membrane, the flexibility of the composite membrane may be excellent while retaining ionic conductivity. Thus, the composite membrane may be processed as desired and the mechanical strength thereof may be improved.

The ion conductive inorganic particles, for example, may include lithium-ion conductive inorganic particles.

An amount of the ion conductive inorganic particles having a hydrophobic coating layer formed thereon is in a range of about 10 parts by weight to about 90 parts by weight, based on 100 parts by weight of a total weight of the composite membrane. When the amount of the ion conductive inorganic particles having a hydrophobic coating layer formed thereon is within the above range, a composite membrane having excellent ionic conductivity and mechanical strength may be obtained.

The ion conductive inorganic particles may be at least one selected from a glassy active metal ion conductor, an amorphous active metal ion conductor, a ceramic active metal ion conductor, and a glass-ceramic active metal ion conductor.

Examples of the ion conductive inorganic particles may be at least one selected from $Li_{1+x+y}Al_xTi_{2-x}Si_yP_{3-y}O_{12}$ (wherein $0<x<2$, $0\leq y<3$), $BaTiO_3$, $Pb(Zr_xTi_{1-x})O_3$ wherein $0\leq x\leq 1$ (PZT), $Pb_{1-x}La_xZr_{1-y}Ti_yO_3$ (PLZT) (wherein $0\leq x<1$, $0\leq y<1$), $Pb(Mg_3Nb_{2/3})O_3$—$PbTiO_3$ (PMN—PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate (e.g., $Li_3PO_4$), lithium titanium phosphate (e.g., $Li_xTi_y(PO_4)_3$, wherein $0<x<2$, $0<y<3$), lithium aluminum titanium phosphate (e.g., $Li_xAl_yTi_z(PO_4)_3$, where $0<x<2$, $0<y<1$, $0<z<3$), $Li_{1+x+y}(Al_qGa_{1-q})_x(Ti_rGe_{1-r})_{2-x}Si_yP_{3-y}O_{12}$ (wherein $0\leq x\leq 1$, $0\leq y\leq 1$, $0\leq q\leq 1$, and $0\leq r\leq 1$), lithium lanthanum titanate ($Li_xLa_yTiO_3$, wherein $0<x<2$, $0<y<3$), lithium germanium thiophosphate ($Li_xGe_yP_zS_w$, wherein $0<x<4$, $0<y<1$, $0<z<1$, $0<w<5$), lithium nitride ($Li_xN_y$, wherein $0<x<4$, $0<y<2$), a $SiS_2(Li_xSi_yS_z)$-based glass, wherein $0<x<3$, $0<y<2$, and $0<z<4$, $P_2S_5(Li_xP_yS_z)$-based glass, wherein $0<x<3$, $0<y<3$, and $0<z<7$, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, a garnet-based ceramic, and $Li_{3+x}La_3M_2O_{12}$ wherein M is at least one selected from tellurium (Te), niobium (Nb), and zirconium (Zr).

$Li_{1.4}Ti_{1.6}Al_{0.4}P_3O_{12}$ (LTAP) or a $Li_2O$—$Al_2O_3$—$SiO_2$—$P_2O_5$—$TiO_2$—$GeO_2$-based ceramics may be used as the ion conductive inorganic particles.

Since the ion conductive inorganic particles have effectively no grain boundaries, the composite membrane including these ion conductive inorganic particles may provide a lithium conductive path having lower resistance. As a result, the conduction and movement of lithium ions may be greatly facilitated and thus, the conductivity of lithium ions and a lithium ion transfer rate may be significantly improved. Also, the flexibility and mechanical strength of the composite membrane may be excellent in comparison to a membrane formed of only inorganic particles.

That the ion conductive inorganic particles have the shape of a single-body particle without grain boundaries may be confirmed by a scanning electron microscope (SEM).

An average particle diameter of the ion conductive inorganic particles may be in a range of about 1 μm to about 300 μm, for example, about 1 μm to about 200 μm, and specifically, about 1 μm to about 150 μm. When the average particle diameter of the ion conductive inorganic particles is within the above range, a composite membrane, which contains ion conductive inorganic particles having the shape of a single-body particle without grain boundaries, may be easily obtained by polishing during the preparation of the composite membrane.

The ion conductive inorganic particles may have a relatively uniform size and maintain the uniform size in the composite membrane. For example, D50 of the ion conductive inorganic particles is in a range of about 110 μm to about 130 μm, and D90 thereof is in a range of about 180 μm to about 200 μm. Also, D10 thereof is in a range of about 60 μm to about 80 μm. Herein, the expressions "D50", "D10", and "D90" respectively denote particle diameters representing about 50 vol %, about 10 vol %, and about 90 vol % in a cumulative distribution curve.

The polymer constituting the composite membrane may be variously selected according to a use of the composite membrane.

When the polymer has barrier properties that block one or more selected from oxygen and moisture, the composite membrane, for example, may have properties of blocking anode corrosive gases. The anode corrosive gases may include water vapor, carbon dioxide, or oxygen. Therefore, the composite membrane may perform a function of an oxygen permeation barrier layer, a moisture barrier layer, or a carbon dioxide permeation barrier layer.

The polymer having barrier properties that block gas and water or moisture, for example, may include a polymer that is obtained by polymerization of a polymerizable non-aqueous floating compound.

The polymerizable non-aqueous floating compound, as a polymerizable organic monomer having water floating properties as well as non-volatile and non-aqueous characteristics, is a material having two or more polymerizable functional groups. Herein, the polymerization includes both copolymerization and cross-linking.

The polymerizable non-aqueous floating compound, for example, may include i) a mixture of a polythiol having 3 or 4 thiol groups and a multifunctional vinyl-based monomer and multifunctional monomer selected from a multifunctional acryl-based monomer and a multifunctional vinyl-based monomer or ii) the multifunctional monomer selected from a multifunctional acryl-based monomer and a multifunctional vinyl-based monomer.

The multifunctional acryl-based monomer may include at least one selected from diurethane dimethacrylate, trimethylolpropane triacrylate, diurethane diacrylate, trimethylolpropane trimethacrylate, neopentyl glycol diacrylate, 3'-acryloxy-2',2'-dimethylpropyl 3-acryloxy-2,2-dimethylpropionate, and bisphenol A diacrylate.

Examples of the multifunctional vinyl-based monomer may include 1,3,5,-triallyl-1,3,5-triazine-2,4,6-trione.

The polythiol may include at least one selected from pentaerythritol tetrakis(3-mercaptopropionate), trimethylolpropane tris(3-mercaptopropionate), 4-mercaptomethyl-3,6-dithia-1,8-octanedithiol, pentaerythritol tetrakis(2-mercaptoacetate), and trimethylolpropane tris(2-mercaptoacetate).

According to another embodiment of the present disclosure, the composite membrane may be used as an anode protective layer of a lithium secondary battery, such as a lithium-sulfur secondary battery and a water-based lithium-ion secondary battery. In addition, the composite membrane may improve the performance of a lithium-ion battery by separating a cathode and an anode electrolyte, and may be used in increasing the possibility of using a greater range of materials.

When the composite membrane is used as a protective layer of a lithium-sulfur secondary battery or a water-based lithium-ion secondary battery, the polymer may form the non-ionic conductive region.

An amount of the polymer in the composite membrane may be in a range of about 10 parts by weight to about 80 parts by weight, for example, about 50 parts by weight to about 80 parts by weight, based on 100 parts by weight of a total weight of the composite membrane. When the amount of the polymer is within the above range, a composite membrane having excellent lithium ion conductivity, flexibility, and gas barrier properties may be obtained without a decrease in membrane formability of the composite membrane.

A weight-average molecular weight of the polymer may be in a range of about 10,000 Daltons (Da) to about 300,000 Da. The weight-average molecular weight is measured by gel permeation chromatography (GPC). When the weight-average molecular weight of the polymer is within the above range, a composite membrane having excellent lithium ion conductivity and moisture and gas barrier properties may be obtained without a decrease in membrane formability.

Since the composite membrane contains ion conductive inorganic particles in high density, resistance of the composite membrane may be low, ranging from about 50 ohms ($\Omega$) to about $9 \times 10^4 \Omega$.

A density of the composite membrane according to an embodiment of the present disclosure may be in a range of about 5 mg/cm$^2$ to about 20 mg/cm$^2$, for example, about 11 mg/cm$^2$ to about 16 mg/cm$^2$. When the above-described composite membrane is used, a thin and lightweight battery may be prepared.

A thickness of the composite membrane may be in a range of about 10 μm to about 200 μm, for example, about 70 μm to about 100 μm. When the thickness of the composite membrane is within the above range, the ionic conductivity and the moisture and gas barrier properties of the composite membrane may be excellent.

The composite membrane may further include a porous support.

Any suitable porous support may be used as long as it has internal pores as well as excellent mechanical properties and heat resistance.

For example, an olefin-based polymer having excellent chemical resistance and hydrophobicity or a sheet or non-woven fabric formed of glass fibers or polyethylene may be used as the porous support.

Examples of the olefin-based polymer may be polyethylene, polypropylene, or a combination thereof. Also, a mixed multilayer, such as a polyethylene/polypropylene double-layered separator, a polyethylene/polypropylene/polyethylene triple-layered separator, or a polypropylene/polyethylene/polypropylene triple-layered separator, may be used.

For example, a polyethylene membrane, a polypropylene membrane, or a combination thereof may be used as the porous support. A pore diameter of the porous support, for example, may be in a range of about 0.01 μm to about 10 μm, and a thickness thereof, for example, may be in a range of about 5 μm to about 35 μm. The porous support may include an electrolyte solution containing a lithium salt and an organic solvent.

A concentration of the lithium salt may be in a range of about 0.01 molar (M) to about 5 M, for example, about 0.2 M to about 2 M. When the concentration of the lithium salt is within the above range, the composite membrane may have excellent conductivity.

The lithium salt may act as a source of lithium ions in a battery by being dissolved in a solvent. Examples of the lithium salt may be at least one selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiOH, LiI, and $LiB(C_2O_4)_2$ (lithium bis(oxalato) borate, LiBOB).

In addition to the lithium salt, other metal salts, for example, $AlCl_3$, $MgCl_2$, NaCl, KCl, NaBr, KBr, or $CaCl_2$, may be further included.

Hereinafter, a method of preparing a composite membrane, according to an embodiment of the present disclosure, will be described.

First, a first operation of floating ion conductive inorganic particles having a hydrophobic coating layer disposed, e.g., formed, thereon and a mixture including a polymerizable non-aqueous floating compound and a solvent on water is performed to provide a first system.

The ion conductive inorganic particles are particles that are hydrophobized by forming a hydrophobic coating layer on a surface thereof.

Any solvent may be used as the solvent so long as it may dissolve and/or spread the polymerizable non-aqueous floating compound. At least one selected from methanol, ethanol, chloroform, methylenechloride, methylethylketone, acetonitrile, acetone, formamide, N,N-dimethylformamide, tetrahydrofuran, N-methyl-2-pyrrolidone, dimethyl sulfoxide, 1,3-dioxolane, sulfolane, dimethyl sulfolane, dichloromethane, acetylacetate, benzene, toluene, 1,2-dichloroethane, and hexane may be used as the solvent.

An amount of the polymerizable non-aqueous floating compound is in a range of about 10 parts by weight to about 1,000 parts by weight, for example, about 150 parts by weight to about 900 parts by weight, based on 100 parts by weight of the ion conductive inorganic particles. When the amount of the polymerizable non-aqueous floating compound is within the above range, a composite membrane having excellent ionic conductivity may be obtained without a decrease in moisture and gas barrier properties.

A second operation of stirring the first system is performed to provide a second system, and a third operation of removing the solvent from the second system is then performed to provide a third system. Subsequently, a fourth operation of performing polymerization by applying heat or light to the third system according to the third operation is performed to form the composite membrane.

In the first operation, a sequence of floating the polymerizable non-aqueous floating compound and the ion conductive inorganic particles on water may be variously changed. For example, the first operation may include i) float casting by floating a mixture including a first portion of the polymerizable non-aqueous floating compound and a solvent on the water; and float casting to float ion conductive inorganic particles on the water by contacting the ion conductive inorganic particles having a hydrophobic coating layer formed on a surface thereof to the water having the polymerizable non-aqueous floating compound and the solvent thereon, and/or ii) float casting by simultaneously floating a monomer mixture including a polymerizable non-aqueous floating compound and a solvent, and ion conductive inorganic particles having a hydrophobic coating layer formed on a surface thereof on water, and/or iii) float casting by floating ion conductive inorganic particles having a hydrophobic coating layer formed on a surface thereof on water; and float casting to float a monomer mixture including a polymerizable non-aqueous floating compound and a solvent on the water by providing the mixture to the product of the second flow casting.

According to an embodiment of the present disclosure, the first operation may include a-1) first floating casting to float a first portion of the mixture including a polymerizable non-aqueous floating compound and a solvent on water; a-2) second float casting to float the ion conductive inorganic particles on the water by contacting the ion conductive inorganic particles having a hydrophobic coating layer formed on a surface thereof to the water having the polymerizable non-aqueous floating compound and the solvent thereon; and a-3) third float casting to float the to float a second portion of the polymerizable non-aqueous floating compound and a solvent on the water by contacting the second portion to the product of the second float casting. Thus, first float casting of the portion of the polymerizable non-aqueous floating compound on water is performed and the ion conductive inorganic particles having a hydrophobic coating layer formed thereon are then provided. Thereafter, second float casting of the remaining polymerizable non-aqueous floating compound on the water may be performed. When these operations are performed, the polymerizable non-aqueous floating compound and the ion conductive inorganic particles may be uniformly dispersed, and the polymerizable non-aqueous floating compound may fill the entire space between the ion conductive inorganic particles by capillary force. As a result, a composite membrane having a structure, in which ion conductive inorganic particles having a hydrophobic coating layer formed thereon fill a plurality of through holes in a polymer layer, may be obtained. A supply amount of the polymerizable non-aqueous floating compound in the first floating casting is in a range of about 30% to about 60%, or about 35% to about 55%, based on a total supply amount, and a supply amount of the polymerizable non-aqueous floating compound in the second floating casting may be in a range of about 40% to about 70%, about 35% to about 65%, based on the total supply amount.

The second operation of stirring the resultant product may comprise air blowing. The air blowing denotes a process of supplying air or an inert gas such as nitrogen gas and argon gas. When the process of supplying air to the resultant product obtained according to the first operation is performed as described above, the non-aqueous floating compound and the ion conductive inorganic particles floating cast on water are stirred to obtain a structure in which a polymer having a plurality of through holes and ion conductive inorganic particles formed in the through holes are included and the ion conductive inorganic particles are exposed to the surface. Thus, a composite membrane having excellent ionic conductivity as well as excellent moisture and gas barrier properties may be obtained.

The third operation of removing the solvent from the resultant product, for example, may be performed in a temperature range of room temperature (about 25° C.) to about 60° C. When the solvent is removed, the ion conductive inorganic particles having a hydrophobic coating layer formed thereon are embedded in a thin film of the polymerizable floating compound.

The solvent is removed, and the fourth operation of performing polymerization by applying heat or light is then performed. When the fourth operation is performed, the polymerization of the polymerizable floating compound proceeds.

A polymerization initiator may be added to the mixture including a polymerizable non-aqueous floating compound and a solvent. A photopolymerization initiator or thermal polymerization initiator may be used as the polymerization initiator.

The photopolymerization initiator may be used without limitation on its configuration as long as it is a compound capable of forming a radical by light such as ultraviolet ray. Examples of the photopolymerization initiator may include at least one selected from 2-hydroxy 2-methyl-1-phenyl-propane-1-on (HMPP), benzoin ether, dialkyl acetophenone, hydroxyl alkylketone, phenyl glyoxylate, benzyl dimethyl ketal, acyl phosphine, and α-aminoketone. As a specific example of the acyl phosphine, commercial lucirin TPO, i.e., 2,4,6-trimethyl-benzoyl-trimethyl phosphine oxide, may be used.

Also, at least one selected from the group consisting of a persulfate-based initiator, an azo-based initiator, hydrogen peroxide, and ascorbic acid may be used as the thermal polymerization initiator. Specifically, examples of the persulfate-based initiator may be sodium persulfate ($Na_2S_2O_8$), potassium persulfate ($K_2S_2O_8$), and ammonium persulfate (($NH_4)_2S_2O_8$), and examples of the azo-based initiator may be 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, and 4,4-azobis-(4-cyanovaleric acid).

The polymerization initiator may be include in an amount of about 0.005 part by weight to about 10.0 parts by weight based on 100 parts by weight of the polymerizable floating compound. When the amount of the polymerization initiator is within the above range, the reactivity of the polymerization of the polymerizable floating compound is excellent.

The light may be ultraviolet (UV) ray. When the polymerization is performed using the light as described above, deformation of a lithium metal thin film by heat may be prevented in advance in a case where a composite membrane is formed on a top of the lithium metal thin film having an electrolyte formed thereon.

Although time for performing the polymerization (cross-linking) by applying light or heat is variable, the time, for example, may be in a range of about 1 minute to about 30 minutes.

When the heat is applied, a heat treatment may vary depending on the type of the polymerizable floating compound, and for example, may be performed in a temperature range of about 60° C. to about 200° C. As another example, the heat treatment may be performed in a temperature range of about 60° C. to about 100° C.

The ion conductive inorganic particles having a hydrophobic coating layer formed on at least one surface thereof may be prepared through b-1) reacting ion conductive inorganic particles and a compound represented by the following Formula 1 and b-2) washing and drying the reaction product.

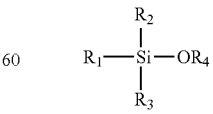

Formula 1

In Formula 1, $R_1$ to $R_3$ each independently represent a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_2$-$C_{20}$ heterocyclic group, or a halogen atom, and $R_4$ represents hydrogen, a substituted or unsubstituted $C_1$-$C_{20}$ alkyl group, or a substituted or unsubstituted $C_6$-$C_{20}$ aryl group.

The ion conductive inorganic particles used in b-1) have an average particle diameter of about 1 μm to about 300 μm, for example, about 1 μm to about 200 μm, and specifically, about 1 μm to about 100 μm through grinding and sieving processes.

A size of the ion conductive inorganic particles is a relatively important factor on the ionic conductivity of the composite membrane. Therefore, the size of the ion conductive inorganic particles is appropriately controlled to obtain a uniform particle shape. For this, only the ion conductive inorganic particles having a desired average particle diameter are collected by sieving and used.

The average particle diameter of the ion conductive inorganic particles may be in a range of about 1 μm to about 300 μm, for example, about 1 μm to about 200 μm, and specifically, about 1 μm to about 100 μm. According to an embodiment of the present disclosure, the average particle diameter of the ion conductive inorganic particles may be in a range of about 90 μm to about 200 μm, for example, about 90 μm to about 100 μm.

According to an embodiment of the present disclosure, a process of milling and sieving the ion conductive inorganic particles may be further performed to obtain the average particle diameter ranging from about 1 μm to about 300 μm before the ion conductive inorganic particles react with the compound of Formula 1.

A bead mill may be used during the milling. Beads may be used in the milling process, wherein a diameter of the beads, for example, may be in a range of about 0.5 μm to about 2 mm, and revolutions per minute (rpm) of a milling machine, for example, may be in a range of about 1,000 rpm to about 2,000 rpm. When the diameter of the beads and the rpm of the milling machine are within the above ranges, the formation of fine LTAP powder may be inhibited.

As a non-limiting example, a material of the beads may include zirconia or alumina.

The reaction of the ion conductive inorganic particles and the compound represented by Formula 1 may be performed by an impregnation method, a spray method, or a ball mill method.

According to an embodiment of the present disclosure, in the reaction of the ion conductive inorganic particles and the compound represented by Formula 1, an impregnation method may be used in which a composition including ion conductive inorganic particles, the compound represented by Formula 1, and a solvent is mixed in a temperature range of room temperature (about 25° C.) to about 60° C. and the solvent is removed therefrom.

According to another embodiment of the present disclosure, in the reaction of the ion conductive inorganic particles and the compound represented by Formula 1, a method may be used in which a composition including the compound represented by Formula 1 and a solvent is sprayed onto the surfaces of ion conductive inorganic particles using a spray method and then mixed.

When performing the impregnation method and the spray method, a solvent, which may uniformly mix and disperse the ion conductive inorganic particles and the compound represented by Formula 1, may be used, and for example, at least one selected from the group consisting of toluene, methylene chloride, methanol, ethanol, propanol, ethyl acetate, and diethyl ether may be used as the solvent.

The washing of the reaction product may be performed by using a solvent such as acetone. The drying of the reaction product may be performed in a temperature range of room temperature (about 25° C.) to about 80° C.

Ion conductive inorganic particles having a hydrophobic coating layer formed on at least one surface thereof are obtained according to the above processes. The ion conductive inorganic particles may have hydrophobicity, the hydrophobic coating layer may be continuous or discontinuous, and a thickness of the coating layer, for example, may be in a range of about 1 nm to about 100 nm. Since the thickness of the hydrophobic coating layer is relatively smaller than a total thickness of the composite membrane, the reduction of the ionic conductivity due to the formation of the hydrophobic coating layer does not occur even if the hydrophobic coating layer is formed on the surfaces of the ion conductive inorganic particles.

The thickness of the hydrophobic coating layer is in a range of about 1 nm to about 80 nm, for example, about 1 nm to about 50 nm, and specifically, about 1 nm to about 15 nm. According to an embodiment of the present disclosure, the thickness of the hydrophobic coating layer is in a range of about 1 nm to about 10 nm.

The thickness of the composite membrane is in a range of about 10 μm to about 200 μm, for example, about 70 μm to about 100 μm.

The composite membrane, as a lithium-ion conductive layer, may protect an anode that may intercalate and deintercalate lithium ions, and may function as a protective layer that prevents a reaction of the anode with other materials by selectively transmitting lithium ions. Also, since the protective layer may be formed as a thin film, the resistance thereof may be decreased and the ionic conductivity thereof may be improved.

The composite membrane may be used as a protective layer or an oxygen permeation barrier layer of a lithium air battery, a protective layer of a lithium-sulfur battery, a protective layer and a separator of a water-based lithium-ion battery, or a separator of a fuel cell.

Also, according to another aspect of the present disclosure, an anode structure including an anode and the above-described composite membrane is provided.

The anode structure may further include an electrolyte between the anode and the composite membrane.

Figure 3A:
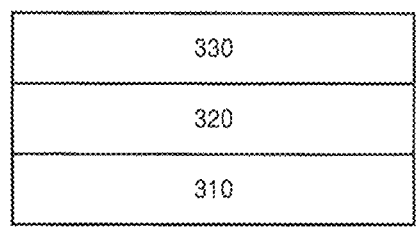
FIG. 3A illustrates a structure of an embodiment of an anode structure including a composite membrane.

FIG. 3A schematically illustrates a structure of an anode structure according to an embodiment of the present disclosure.

Referring to FIG. 3A, an anode structure 300 has a structure in which an electrolyte 320 is disposed between an anode 310 and a composite membrane 330. Herein, the electrolyte 320 may be omitted.

A lithium metal thin film, for example, may be used as the anode 310, and the composite membrane may act as a lithium metal protective layer. Thus, when the composite membrane according to the embodiment of the present disclosure is used, a metal-air battery having excellent oxygen barrier properties as well as excellent flexibility and lightness may be prepared.

An aqueous electrolyte or a non-aqueous electrolyte may be used as the electrolyte. The same electrolyte as that used in the preparation of a lithium air battery to be described later may be used as the electrolyte.

According to another aspect of the present disclosure, a lithium secondary battery including the above-described composite membrane is provided.

The lithium secondary battery, for example, may include a lithium air battery. The lithium air battery includes an anode, a composite membrane, and a cathode including oxygen as a cathode active material.

The lithium air battery may use an aqueous electrolyte or a non-aqueous electrolyte as an electrolyte between the cathode and the anode.

When the non-aqueous electrolyte is used as the electrolyte, a reaction mechanism, such as the following Reaction Formula 1, may occur:

$$4Li+O_2 \rightarrow 2Li_2O \; E°=2.91V$$

$$2Li+O_2 \rightarrow Li_2O_2 \; E°=3.10V \qquad \text{Reaction Formula 1}$$

Lithium derived from the anode during discharge is mixed with oxygen introduced from the cathode to generate lithium oxide, and the oxygen is reduced. In contrast, the lithium oxide is reduced during charge, and the reduced oxygen is oxidized to generate oxygen.

The shape of the lithium air battery is not particularly limited, and the shape thereof may be, for example, a coin type, a button type, a sheet type, a laminated type, a cylindrical type, a flat type, or a horn type. In addition, the lithium air battery may be applied to large-sized batteries that are used in electric vehicles.

Figure 3B:
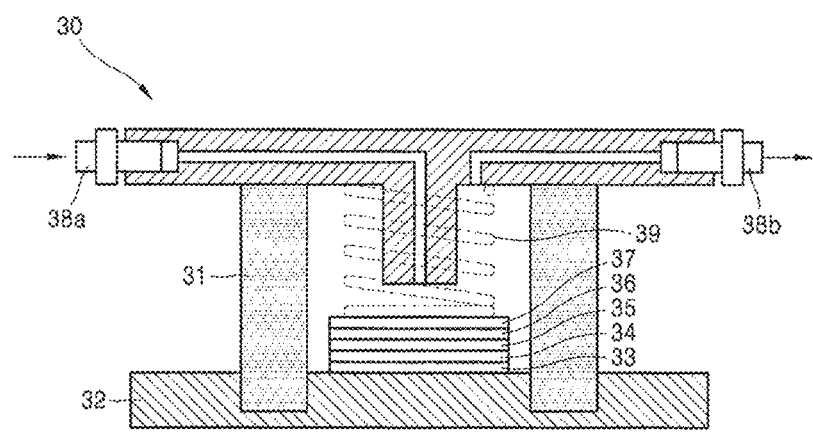
FIG. 3B schematically illustrates an embodiment of a structure of a lithium air battery including an embodiment of a composite membrane.

FIG. 3B schematically illustrates a lithium air battery according to an embodiment of the present disclosure.

A lithium air battery 30 has a structure, in which a composite membrane 35 according to the embodiment of the present disclosure is disposed between an anode 33 and a cathode 37 including oxygen as an active material. An electrolyte 34 may be disposed between the anode 33 and the composite membrane 35. The anode 33, the electrolyte 34, and the composite membrane 35 constitute a protective anode.

The electrolyte 34 has low resistance per area when combined with the anode 33 as well as excellent conductivity of lithium ions.

A lithium-ion conductive solid electrolyte membrane or a separator may be further included between the anode 33 and the electrolyte 34 or the electrolyte 34 and the composite membrane 35.

The cathode 37 includes a current collector, and a pressing member 39, through which air may be transferred to the cathode 37, is disposed on the current collector. As illustrated in FIG. 3B, a case 31 formed of an insulating resin material, which includes the cathode 37 and the anode 33, is disposed. Air is supplied to an air inlet 38a and discharged from an air outlet 38b.

The expression "air" used in the present specification is not limited to ambient air, but may include a combination of gases including oxygen, or pure oxygen gas.

An electrolyte 36 is disposed between the composite membrane 35 and the cathode 37.

A lithium-ion conductive solid electrolyte membrane or a separator may be further included between the cathode 37 and the electrolyte 36 or the electrolyte 36 and the composite membrane 35.

The composite membrane 35 is formed on a surface of the anode 33 so as to act as a protective layer that protects lithium of the anode 33 from the electrolyte 36.

The composite membrane 35 may be used as a single layer or multiple layers.

A polymer solid electrolyte may be used as the electrolytes 34 and 36. The polymer solid electrolyte may be polyethylene oxide doped with a lithium salt, and examples of the lithium salt may be $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

According to another embodiment of the present disclosure, the electrolytes 34 and 36 may be a liquid electrolyte including a solvent and a lithium salt.

At least one selected from an aprotic solvent and water may be included as the solvent.

A carbonate-based, ester-based, ether-based, ketone-based, amine-based, or phosphine-based solvent may be used as the aprotic solvent.

Dimethyl carbonate (DMC), diethyl carbonate (DEC), ethylmethyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), or butylene carbonate (BC) may be used as the carbonate-based solvent.

Methyl acetate, ethyl acetate, n-propyl acetate, t-butyl acetate, methyl propionate, ethyl propionate, γ-butyrolactone, decanolide, valerolactone, mevalonolactone, or caprolactone may be used as the ester-based solvent.

Dibutyl ether, tetraglyme, diglyme, dimethoxyethane, 2-methyltetrahydrofuran, or tetrahydrofuran may be used as the ether-based solvent, and cyclohexanone may be used as the ketone-based solvent.

Also, triethylamine or triphenylamine may be used as the amine-based solvent. Triethylphosphine may be used as the phosphine-based solvent. However, an embodiment of the present disclosure is not limited thereto, and any aprotic solvent usable in the art may be used.

Also, nitriles such as R—CN (wherein R is a hydrocarbon group with a carbon number of about 2 to about 30 having a linear, branched, or cyclic structure, and may include a double-bond, an aromatic ring or an ether bond), amides such as dimethylformamide, dioxolanes such as 1,3-dioxolane, or sulfolanes may be used as the aprotic solvent.

The aprotic solvent may be used alone or by mixing two or more aprotic solvents. When the aprotic solvent is used by mixing one or more aprotic solvents, a mixing ratio may be appropriately adjusted according to a battery performance and this may be widely understood by those of ordinary skill in the art.

Also, the electrolytes 34 and 36 may include an ionic liquid.

Linear or branched, substituted compounds composed of cations, such as ammonium, imidazolium, pyrrolidinium, and piperidinium, and anions, such as $PF_6^-$, $BF_4^-$, $CF_3SO_3^-$, $(CF_3SO_2)_2N^-$, $(C_2F_5SO_2)_2N^-$, and $(CN)_2N^-$, may be used as the ionic liquid.

A portion or all of the electrolytes 34 and 36 may be impregnated in the cathode or the anode.

According to another embodiment of the present disclosure, a lithium-ion conductive solid electrolyte membrane may be used as the electrolytes 34 and 36.

Examples of the lithium-ion conductive solid electrolyte membrane may be inorganic materials containing lithium-ion conductive glass, lithium-ion conductive crystals (ceramic or glass-ceramic), or a mixture thereof. The lithium-ion conductive solid electrolyte membrane may include an oxide in consideration of chemical stability.

Since high ionic conductivity may be obtained when the lithium-ion conductive solid electrolyte membrane includes a large amount of lithium-ion conductive crystals, the lithium-ion conductive solid electrolyte membrane, for example, may include lithium-ion conductive crystals in an amount of about 50 wt % or more or about 55 wt % or more based on a total weight of the lithium-ion conductive solid electrolyte membrane.

Crystals with a perovskite structure having lithium ion conductivity, such as $Li_3N$, LISICON, and $La_{0.55}Li_{0.35}TiO_3$, $LiTi_2P_3O_{12}$ having a NASICON-type structure, or glass-ceramic precipitating these crystals may be used as the lithium-ion conductive crystals.

The lithium-ion conductive crystals, for example, may be $Li_{1+x+y}(Al, Ga)_x(Ti, Ge)_{2-x}Si_yP_{3-y}O_{12}$ (where $0 \leq x \leq 1$, $0 \leq y \leq 1$, for example, $0 \leq x \leq 0.4$, $0 < y \leq 0.6$, or $0.1 \leq x \leq 0.3$, $0.1 \leq y \leq 0.4$). In order to have high ionic conductivity, the lithium-ion conductive crystals may not include grain boundaries that obstruct ion conduction. For example, since glass-ceramic almost does not have pores or grain boundaries that obstruct ion conduction, high ionic conductivity as well as excellent chemical stability may be obtained.

Examples of the lithium-ion conductive glass-ceramic may be lithium-aluminum-germanium-phosphate (LAGP), lithium-aluminum-titanium-phosphate (LATP), and lithium-aluminum-titanium-silicon-phosphate (LATSP).

For example, in a case where parent glass has a $Li_2O$—$Al_2O_3$—$TiO_2$—$SiO_2$—$P_2O_5$-based composition and the parent glass is crystallized by a heat treatment, a main crystalline phase in this case becomes $Li_{1+x+y}Al_xTi_{2-x}Si_yP_{3-y}O_{12}$ (where $0 \leq x \leq 1$, $0 \leq y \leq 1$), wherein x and y, for example, may satisfy $0 \leq x \leq 0.4$ and $0 < y \leq 0.6$, or $0.1 \leq x \leq 0.3$ and $0.1 < y \leq 0.4$.

Herein, the pores or the grain boundaries that obstruct on conduction refers to an ionic conduction inhibitor, such as pores or grain boundaries, which may reduce a total conductivity of an inorganic material including lithium-ion conductive crystals to a level of about 1/10 or less of the conductivity of the lithium-ion conductive crystals themselves.

A conductive material may be used as the cathode using oxygen as a cathode active material. The conductive material may be porous. Therefore, any material having porosity and conductivity may be used as the cathode active material without limitation and, for example, a porous carbon-based material may be used. Carbon black, graphite, graphene, activated carbon, and carbon fibers may be used as the carbon-based material.

Also, a metallic conductive material, such as metal fibers and metal meshes, may be used as the cathode active material. Furthermore, metallic powder, such as copper, silver, nickel, or aluminum powder, may be used as the cathode active material. An organic conductive material, such as a polyphenylene derivative, may also be used. The above-described conductive materials may be used alone or in a mixture thereof.

A catalyst for oxidation/reduction of oxygen may be added to the cathode. Precious metal-based catalysts such as platinum, gold, silver, palladium, ruthenium, rhodium, and osmium, oxide-based catalysts such as manganese oxide, iron oxide, cobalt oxide, and nickel oxide, or organic metal-based catalysts such as cobalt phthalocyanine may be used as the catalyst. However, the catalyst is not limited thereto, and any material usable as an oxidation/reduction catalyst of oxygen in the art may be used.

Also, the catalyst may be supported in a carrier. The carrier may be formed of oxide, zeolite, a clay mineral, or carbon. The oxide may include at least one oxide such as alumina, silica, zirconium oxide, and titanium dioxide. The oxide may be an oxide including at least one metal selected from the group consisting of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). The carbon may be carbon black such as Ketjen black, acetylene black, channel black, and lamp black, graphite such as natural graphite, artificial graphite, and expanded graphite, activated carbon, or carbon fibers. However, an embodiment of the present disclosure is not limited thereto, and any material usable as a carrier in the art may be used.

The cathode may further include a binder. The binder may include a thermoplastic resin or a thermosetting resin. For example, polyethylene, polypropylene, polytetrafluoroethylene (PTFE), polyvinylidene fluoride (PVDF), a styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer may be used alone or in a mixture thereof. However, the binder is not limited thereto, and any material usable as a binder in the art may be used.

The oxygen redox catalyst, the conductive material, and the binder are mixed, and a cathode slurry is then prepared by adding an appropriate solvent thereto. Then, the cathode, for example, may be prepared by coating a surface of a current collector with the cathode slurry and drying the coated current collector or by compression molding the cathode slurry on a current collector to selectively increase electrode density. Also, the cathode may selectively include lithium oxide. Furthermore, the redox catalyst for oxygen may be selectively omitted.

In order to increase a diffusion rate of oxygen, a porous body in the shape of a net or a mesh may be used or a porous metal plate, such as stainless steel, nickel, and aluminum plates, may be used as the current collector. However, the current collector is not limited thereto, and any material usable as a current collector in the art may be used. The current collector may be coated with an oxidation-resistant metal or alloy coating layer to prevent its oxidation.

An anode including lithium (Li), as the anode of the lithium air battery, may use a Li metal, a Li metal-based alloy, or an electrode containing a material capable of intercalating and deintercalating Li. However, the anode is not limited thereto, and any material usable as an anode in the art may be used so long as it may include lithium or may intercalate or deintercalate lithium. The anode may determine a capacity of the lithium air battery.

The anode, for example, may be a lithium metal thin film. Examples of the lithium metal-based alloy may be alloys of lithium and aluminum, tin, magnesium, indium, calcium, titanium, or vanadium.

Also, a separator may be disposed between the cathode and the anode. The separator is not limited so long as it may have a composition which may function within an operational range of the lithium air battery. Examples of the separator may be a polymer non-woven fabric, such as a polypropylene non-woven fabric or a polyphenylene sulfide non-woven fabric, and a porous film of an olefin-based resin, such as polyethylene or polypropylene. Also, a combination of two or more thereof may be used as the separator.

Since the lithium air battery according to the embodiment of the present disclosure uses the above-described composite membrane, specific capacity and lifetime characteristics may be improved.

A lithium secondary battery according to an embodiment of the present disclosure, for example, may include a lithium-sulfur secondary battery or a lithium-ion secondary battery.

Figure 3C:
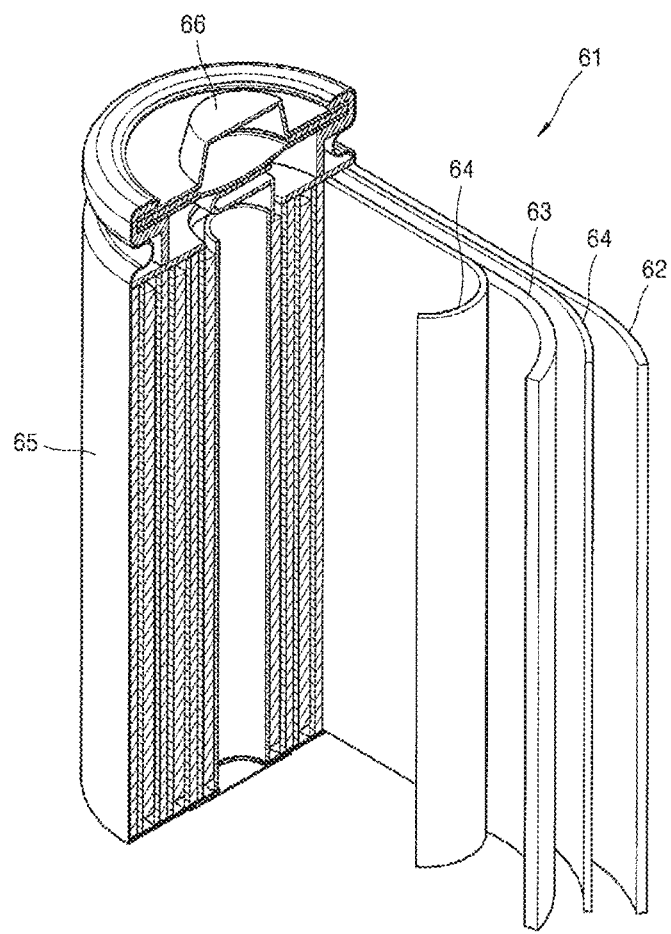
FIG. 3C is a schematic view illustrating a structure of an embodiment of a lithium secondary battery.

A lithium secondary battery 61 using the composite membrane according to the embodiment of the present disclosure as a lithium metal protective layer is illustrated in FIG. 3C.

Referring to FIG. 3C, the lithium secondary battery 61 includes a cathode 63, an anode 62, and a separator 64. The cathode 63, the anode 62, and the separator 64 are wound or folded to be contained in a battery case 65. Subsequently, an organic electrolyte solution is injected into the battery case 65 and the lithium secondary battery 61 is completed by being sealed with a cap assembly 66.

The battery case 65 may be a cylindrical type as illustrated in FIG. 3C, or may be a prismatic or thin-film type. For example, the lithium secondary battery 61 may be a thin-film type battery.

The separator 64 is disposed between the cathode 63 and the anode 62 such that a battery structure may be formed. The battery structure is stacked in a bi-cell structure, and then impregnated in an organic electrolyte solution. A lithium-ion polymer battery is completed when the product thus obtained is contained in a pouch and sealed.

Any polymer may be used as the polymer contained in the composite membrane so long as it may protect a lithium anode.

A carbon material may be used as a material able to reversibly intercalate/deintercalate the lithium ions, i.e., an anode active material of the anode in the lithium-sulfur secondary battery.

Any carbon-based anode active material that is generally used in a lithium-sulfur secondary battery may be used as the carbon material. Typical examples of the carbon material may be crystalline carbon, amorphous carbon, or a mixture thereof. Also, typical examples of a material capable of reversibly forming a lithium-containing compound by reacting with the lithium ions may be tin oxide ($SnO_2$), titanium nitrate, and silicon (Si). However, an embodiment of the present disclosure is not limited thereto. An alloy of lithium and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn) may be used as the lithium alloy.

In the lithium-sulfur secondary battery, elemental sulfur ($S_8$), an elemental sulfur-containing compound, or a mixture thereof may be used as a cathode active material of the cathode. At least one selected from the group consisting of $Li_2S_n$ (where $n \geq 1$), $Li_2S_n$ (where $n \geq 1$) dissolved in catholyte, an organic sulfur compound, and a carbon-sulfur polymer (($C_2S_x$)$_n$, where x is about 2.5 to about 50, $n \geq 2$) may be used as the elemental sulfur-containing compound.

In the lithium-ion secondary battery, a compound enabling reversible intercalation and deintercalation of lithium ions (lithiated intercalation compound) may be used as a cathode active material of the cathode. The cathode active material may include at least one selected from the group consisting of lithium cobalt oxide, lithium nickel cobalt manganese oxide, lithium nickel cobalt aluminum oxide, lithium iron phosphate, and lithium manganese oxide. However, the cathode active material is not limited thereto and any cathode active material may be used as long as it is used in the art.

Examples of the cathode active material may be at least one selected from the group consisting of lithium cobalt oxide ($LiCoO_2$); lithium nickel oxide of Chemical Formula $LiNiO_2$; lithium manganese oxides such as compounds of Chemical Formulae $Li_{1+x}Mn_{2-x}O_4$ (where x is about 0 to about 0.33), $LiMnO_3$, $LiMn_2O_3$, and $LiMnO_2$; lithium copper oxide of Chemical Formula $Li_2CuO_2$; lithium iron oxide of Chemical Formula $LiFe_3O_4$; lithium vanadium oxide of Chemical Formula $LiV_3O_8$; copper vanadium oxide of Chemical Formula $Cu_2V_2O_7$; vanadium oxide of Chemical Formula $V_2O_5$; lithium nickel oxides of Chemical Formula $LiNi_{1-x}M_xO_2$ (where M=Co, Mn, Al, Cu, Fe, Mg, boron (B), or gallium (Ga), and x is about 0.01 to about 0.3); lithium manganese complex oxides of Chemical Formula $LiMn_{2-x}M_xO_2$ (where M=Co, Ni, Fe, Cr, zinc (Zn) or tantalum (Ta), and x is about 0.01 to about 0.1) or $Li_2Mn_3MO_8$ (where M=Fe, Co, Ni, Cu, or Zn); lithium manganese oxide in which a portion of Li of $LiMn_2O_4$ is substituted with alkaline earth metal ions; disulfide compounds; and iron molybdenum oxide of Chemical Formula $Fe_2(MoO_4)_3$.

Also, a carbon-based material, silicon, silicon oxide, a silicon-based alloy, a silicon-carbon-based material composite, tin, a tin-based alloy, a tin-carbon composite, metal oxide, or a combination thereof may be used as the cathode active material.

The carbon-based material may include carbon, graphite, or carbon nanotubes.

In the anode of the lithium-ion secondary battery, examples of the anode active material may be one selected from the group consisting of Si, $SiO_x$ (where 0<x<2, for example, 0.5<x<1.5), Sn, $SnO_2$, a silicon-containing metal alloy, and a mixture thereof. At least one selected from the group consisting of Al, Sn, silver (Ag), Fe, Bi, Mg, Zn, indium (In), germanium (Ge), lead (Pb), and titanium (Ti) may be used as a metal that may form the silicon-containing metal alloy.

The anode active material may include metal/semi-metal alloyable with lithium, an alloy thereof, or an oxide thereof. Examples of the metal/semi-metal alloyable with lithium may be Si, Sn, Al, Ge, Pb, Bi, Sb, a Si—Y' alloy (where Y' is alkaline metal, alkaline earth metal, a Group 13 to 16 element, a transition metal, a rare earth element, or a combination thereof, and is not Si), a Sn—Y" alloy (where Y" is alkaline metal, alkaline earth metal, a Groups 13 to 16 element, a transition metal, a rare earth element, or a combination thereof, and is not Sn), or $MnO_x$ (where 0<x≤2). Examples of the element Y' and Y" may be Mg, Ca, Sr, Ba, Ra, scandium (Sc), yttrium (Y), Ti, Zr, hafnium (Hf), rutherfordium (Rf), V, Nb, Ta, dubnium (Db), Cr, Mo, W, seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, Ag, gold (Au), Zn, cadmium (Cd), B, Al, Ga, Sn, In, Ge, phosphorus (P), arsenic (As), Sb, Bi, sulfur (S), selenium (Se), tellurium (Te), polonium (Po), or a combination thereof. For example, the oxide of the metal/semi-metal alloyable with lithium may be lithium titanate, vanadium oxide, lithium vanadium oxide, $SnO_2$, or $SiO_x$ (where 0<x<2).

For example, the anode active material may include at least one element selected from Group 13 elements, Group 14 elements, and Group 15 elements of the Periodic Table.

For example, the anode active material may include at least one element selected from the group consisting of Si, Ge, and Sn.

The anode active material may be a mixture of a carbon-based material and one selected from the group consisting of silicon, silicon oxide, and a silicon-containing metal alloy, or a composite of a carbon-based material and one selected from the group consisting of silicon, silicon oxide, and a silicon-containing metal alloy.

For example, the shape of the anode active material may be a simple particle shape and may be a nanostructure having nanoscale dimensions. For example, the anode active material may have various shapes such as shapes of nano particles, nanowires, nanorods, nanotubes, and nanobelts.

A mixed multilayer, such as a polyethylene/polypropylene double-layered separator, a polyethylene/polypropylene/polyethylene triple-layered separator, or a polypropylene/polyethylene/polypropylene triple-layered separator, may be used as the separator disposed between the cathode and the anode.

The electrolyte solution used in the lithium secondary battery may include an organic solvent and a lithium salt.

Examples of the organic solvent may be at least one solvent selected from benzene, fluorobenzene, toluene, dimethylformamide, dimethylacetate, trifluorotoluene, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, and sulfolane.

At least one lithium salt selected from the group consisting of lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethane sulfonate ($LiSO_3CF_3$), lithium bis(trifluoromethyl)sulfonimide ($LiN(SO_2CF_3)_2$), and lithium bis(perfluoroethylsulfonyl) imide ($LiN(SO_2C_2F_5)_2$) may be used as the lithium salt.

In the electrolyte solution, a concentration of the lithium salt may be about 0.01 M to about 5 M, for example, about 0.1 M to about 2.0 M.

With respect to the above-described lithium secondary battery, such as the lithium-sulfur secondary battery and the lithium-ion secondary battery, the lithium anode is protected so that a side reaction between the lithium anode and the electrolyte solution may not only be inhibited, but lithium ion conductivity may also be improved. Therefore, the conductivity and lifetime characteristics of the lithium secondary battery may be improved.

Definitions of substituents that are used in the chemical formulae presented in the present specification will be described as follows.

The expression "alkyl" used in the chemical formula denotes fully saturated branched or unbranched (or straight or linear) hydrocarbon.

Non-limiting examples of the "alkyl" may include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the "alkyl" group may be substituted with a halogen atom, a halogen atom-substituted C1-C20 alkyl group (e.g., —$CF_3$, —$CHF_2$, —$CH_2F$, or —$CCl_3$), C1-C20 alkoxy, C2-C20 alkoxyalkyl, a hydroxyl group, a nitro group, a cyano group, an amino group, an amidino group, a hydrazine group, a hydrazone group, a carboxyl group or a salt thereof, a sulfonyl group, a sulfamoyl group, a sulfonic acid group or a salt thereof, phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The expression "halogen atom" includes fluorine, bromine, chlorine, and iodine.

The expression "halogen atom-substituted C1-C20 alkyl group" denotes a C1-C20 alkyl group substituted with at least one halo group, and non-limiting examples of the "halogen atom-substituted C1-C20 alkyl group" may include monohaloalkyl, or polyhaloalkyl including dihaloalkyl, and perhaloalkyl.

Monohaloalkyl denotes a case of having one iodine, bromine, chlorine, or fluorine atom in an alkyl group, and dihaloalkyl and polyhaloalkyl denote an alkyl group having two or more same or different halo atoms.

The expression "alkoxy" used in the chemical formula denotes alkyl-O—, and the alkyl is the same as described above. Non-limiting examples of the "alkoxy" may include methoxy, ethoxy, propoxy, 2-propoxy, butoxy, tert-butoxy, pentyloxy, and hexyloxy. At least one hydrogen atom of the "alkoxy group" may be substituted with the same substituent as in the case of the above-described alkyl group.

The expression "alkenyl" group used in the chemical formula denotes branched or unbranched hydrocarbon having at least one carbon-carbon double bond. Non-limiting examples of the "alkenyl" group may include vinyl, allyl, butenyl, isopropenyl, and isobutenyl, and at least one hydrogen atom of the "alkenyl group" may be substituted with the same substituent as in the case of the above-described alkyl group.

The expression "alkynyl" group used in the chemical formula denotes branched or unbranched hydrocarbon having at least one carbon-carbon triple bond. Non-limiting examples of the "alkynyl" may include ethynyl, butynyl, isobutynyl, and isopropynyl.

At least one hydrogen atom of the "alkynyl group" may be substituted with the same substituent as in the case of the above-described alkyl group.

The expression "aryl" group used in the chemical formula denotes aromatic hydrocarbon including at least one ring by being used alone or in a combination thereof.

The expression "aryl" also includes a group in which an aromatic ring is fused to at least one cycloalkyl ring.

Non-limiting examples of the "aryl" may include phenyl, naphthyl, and tetrahydronaphthyl.

Also, at least one hydrogen atom of the "aryl" group may be substituted with the same substituent as in the case of the above-described alkyl group The expression "arylalkyl" denotes an alkyl substituted with an aryl. Examples of "arylalkyl" may include benzyl or phenyl-$CH_2CH_2$—.

The expression "aryloxy" used in the chemical formula denotes —O-aryl, and examples of the aryloxy" may include phenoxy. At least one hydrogen atom of the "aryloxy group" may be substituted with the same substituent as in the case of the above-described alkyl group.

The expression "heteroaryl" group used in the chemical formula denotes a group derived from a monocyclic or bicyclic aromatic organic compound which includes at least one heteroatom selected from the group consisting of nitrogen (N), oxygen (O), P, or S, and the remaining cyclic atoms are carbons. The 'heteroaryl' group, for example, may include about 1 to 5 hetero atoms and about 5 to 10 ring members. The S or N may be oxidized to have various oxidation states.

At least one hydrogen atom of the "heteroaryl" group may be substituted with the same substituent as in the case of the above-described alkyl group.

The expression "heteroarylalkyl" denotes an alkyl substituted with a heteroaryl.

The expression "heteroaryloxy" denotes an —O-heteroaryl moiety. At least one hydrogen atom of the "heteroaryloxy" group may be substituted with the same substituent as in the case of the above-described alkyl group.

The expression "carbon ring" group used in the chemical formula denotes a saturated or partially unsaturated non-aromatic monocyclic, bicyclic, or tricyclic hydrocarbon group.

Examples of the monocyclic hydrocarbon may be cyclopentyl, cyclopentenyl, cyclohexyl, and cyclohexenyl, and examples of the bicyclic hydrocarbon may be bornyl, decahydronaphthyl, bicyclo[2.1.1]hexyl, bicyclo[2.2.1]heptyl, bicyclo[2.2.1]heptenyl, or bicyclo[2.2.2]octyl.

Examples of the tricyclic hydrocarbon may be adamantyl.

At least one hydrogen atom of the "carbon ring" may be substituted with the same substituent as in the case of the above-described alkyl group.

The expression "hetero ring" group used in the chemical formula denotes a ring group which is formed of about 5 to 10 atoms including a heteroatom such as nitrogen, sulfur, phosphorus, and oxygen, specific examples thereof may be pyridyl, and at least one hydrogen atom of the "hetero ring" group may be substituted with the same substituent as in the case of the above-described alkyl group.

The expression "sulfonyl" denotes an R"—SO$_2$—, and R" includes hydrogen, alkyl, aryl, heteroaryl, aryl-alkyl, heteroaryl-alkyl, alkoxy, aryloxy, a cycloalkyl group, or a hetero ring group.

The expression "sulfamoyl" group includes H$_2$NS(O$_2$)—, alkyl-NHS(O$_2$)—, (alkyl)$_2$NS(O$_2$)—, aryl-NHS(O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, or (heteroaryl-alkyl)-NHS(O$_2$)—.

At least one hydrogen atom of the "sulfamoyl" group may be substituted with the same substituent as in the case of the above-described alkyl group.

The expression "amino" group denotes a case in which a nitrogen atom is covalent bonded with at least one carbon or heteroatom. The "amino" group, for example, includes —NH$_2$ and substituted moieties, and also includes "alkylamino", in which a nitrogen atom is bonded to at least one additional alkyl group, and "arylamino" and "diarylamino" in which a nitrogen atom is bonded to at least one independently selected aryl group.

"Acryl" includes the ester, acid, and salt forms.

A Barrer is $10^{-11}$ (cm$^3$ O$_2$) cm cm$^{-2}$ s$^{-1}$mmHg$^{-1}$, wherein "cm$^3$ O$_2$" represents a molar quantity of oxygen.

Hereinafter, the present disclosure will be described in more detail, according to the following examples. However, the scope of the present disclosure is not limited thereto.

EXAMPLES

Example 1

Preparation of Composite Membrane

A lithium-titanium-aluminum-phosphate (LTAP: Li$_{1.4}$Ti$_{1.6}$Al$_{0.4}$P$_3$O$_{12}$) membrane (Ohara glass, Ohara Corporation) was milled and the milled powder thus obtained was sieved using sieves respectively having an opening of about 90 μm and about 100 μm to prepare LTAP particles having a diameter (average particle diameter) of about 95 μm.

About 300 mg of the LTAP particles, about 20 ml of toluene, and about 50 mg of isobutyl(triethoxy)silane (IB) were introduced into a vial and stirred for about 7 hours.

The resultant product was cleaned with acetone and vacuum dried at about 60° C. for about 2 hours to obtain LTAP particles on which a hydrophobic coating layer formed of a condensation reaction product of IB was formed.

Separately, about 500 mg of diurethane dimethacrylate (DU) was dissolved in about 4 ml of a mixed solvent of ethanol and chloroform (mixed volume ratio of about 1:1) to obtain a mixture. About 30 mg of Irgacure 369 (BASF) represented by the following formula, as a photoinitiator, was added to the mixture and stirred to obtain a composition for forming a polymer layer.

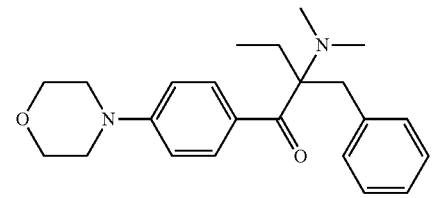

Irgacure 369 (BASF)

About 200 μL among about 400 μL of the composition for forming a polymer layer thus obtained was added dropwise to the surface of water in a petri dish filled with the water. Subsequently, about 10 mg of the LTAP particles having a hydrophobic coating layer formed thereon was spread onto the resultant product and a reaction mixture was stirred by purging nitrogen to form a vortex on the surface of the water.

Thereafter, about 200 μL of the remaining composition for forming a polymer layer thus obtained was again added and then dried for about 1 hour to remove the solvent.

Photopolymerization of diurethane dimethacrylate (DU) was performed by irradiating the surface of the water with ultraviolet (UV) for about 15 minutes using a low-pressure mercury lamp (about 0.01 W/cm$^2$) to obtain a composite membrane. The composite membrane was separated from the surface of the water using tweezers. Herein, the composite membrane includes a polymer layer having a plurality of through holes and LTAP particles formed in the through holes, wherein the composite membrane has a structure in which a hydrophobic coating layer formed of a condensation reaction product of IB is formed on the surfaces of the LTAP particles. Herein, a thickness of the hydrophobic coating layer was about 10 nm or less, an amount of the condensation reaction product of IB was about 1 part by weight based on 100 parts by weight of the LTAP particles, and an amount of the LTAP particles having a hydrophobic coating layer formed thereon was about 43 parts by weight based on 100 parts by weight of a total weight of the composite membrane. An average thickness of the composite membrane was in a range of about 90 μm to about 95 μm.

Example 2

Preparation of Composite Membrane

A composite membrane was obtained in the same manner as in Example 1 except that about 500 mg of trimethylolpropane triacrylate (TA, Aldrich) was used instead of about 500 mg of diurethane dimethacrylate (DU, Aldrich), a mixture of isomers, during the preparation of a monomer mixture. Herein, a thickness of a hydrophobic coating layer was about 10 nm or less, an amount of a condensation reaction product of IB was about 1 part by weight based on 100 parts by weight of the LTAP particles, and an amount of the LTAP particles having a hydrophobic coating layer formed thereon was about 43 parts by weight based on 100 parts by weight of a total weight of the composite membrane. An average thickness of the composite membrane was in a range of about 90 µm to about 95 µm.

Example 3

Preparation of Composite Membrane

A composite membrane was prepared in the same manner as in Example 1 except that octyl(trimethoxy)silane was used instead of isobutyl(triethoxy)silane (IB) during the preparation of LTAP particles having a hydrophobic coating layer formed thereon.

Example 4 and 5

Preparation of Composite Membranes

Composite membranes were prepared in the same manner as in Example 1 except that process conditions were changed to respectively include a condensation reaction product of IB constituting a hydrophobic coating layer of the composite membrane in an amount of about 0.1 part by weight and about 30 parts by weight based on 100 parts by weight of LTAP particles.

Example 6 and 7

Preparation of Composite Membranes

Composite membranes were prepared in the same manner as in Example 1 except that process conditions were changed to respectively include LTAP particles having a hydrophobic coating layer formed thereon in an amount of about 10 parts by weight and about 90 parts by weight.

Example 8 and 9

Preparation of Composite Membranes

Composite membranes were prepared in the same manner as in Example 2 except that process conditions were changed to respectively include a condensation reaction product of IB constituting a hydrophobic coating layer of the composite membrane in an amount of about 0.1 part by weight and about 30 parts by weight based on 100 parts by weight of LTAP particles.

Example 10 and 11

Preparation of Composite Membranes

Composite membranes were prepared in the same manner as in Example 2 except that process conditions were changed to respectively include LTAP particles having a hydrophobic coating layer formed thereon in an amount of about 10 parts by weight and about 90 parts by weight.

Comparative Example 1

Preparation of Composite Membrane

A lithium-titanium-aluminum-phosphate (LTAP: $Li_{1.4}Ti_{1.6}Al_{0.4}P_3O_{12}$) membrane (Ohara glass, Ohara Corporation) was milled and the milled powder thus obtained was sieved using sieves respectively having an opening of about 90 µm and about 100 µm to prepare LTAP particles having a diameter of about 90 µm to about 100 µm.

Separately, about 500 mg of diurethane dimethacrylate was dissolved in about 4 ml of a mixed solvent of ethanol and chloroform (mixed volume ratio of about 1:1) to obtain a monomer mixture. About 30 mg of Irgacure 369 (BASF), as a photoinitiator, was added to the monomer mixture and stirred to obtain a composition for forming a polymer layer.

About 200 µL of the composition for forming a polymer layer thus obtained was added dropwise to the surface of water in a petri dish filled with the water. Subsequently, about 10 mg of the LTAP particles was spread onto the resultant product and nitrogen was purged on the surface thereof.

Thereafter, about 200 µL of the remaining composition for forming a polymer layer was again added and then dried for about 1 hour to remove the solvent. Photopolymerization of diurethane dimethacrylate was performed by irradiating the surface of the water with ultraviolet (UV) for about 15 minutes using a low-pressure mercury lamp (about 0.01 W/cm$^2$) to obtain a composite membrane.

Comparative Example 2

Preparation of Polyethylene Oxide (PEO) Polymer Electrolyte

About 1.38 g of polyethylene oxide powder (weight-average molecular weight of about 100,000, Aldrich) and about 0.9 g of $Li(CF_3SO_2)_2N$ (LiTFSI, Wako) were dispersed in about 100 ml of acetonitrile (AN) and stirred for about 24 hours to prepare a composition for forming an electrolyte.

The stirred composition for forming an electrolyte was cast on a Teflon dish and then dried at about 20° C. for about 24 hours to remove the AN solvent. Then, the Teflon dish was dried at about 60° C. for about 12 hours in vacuum to obtain a $PEO_{10}LiTFSI$ polymer electrolyte (hereinafter, referred to as "PEO polymer electrolyte"). A molar ratio of ethylene oxide (EO) and lithium in the polymer electrolyte was about 20:1.

Comparative Example 3

Preparation of LTAP Membrane

An LTAP membrane (Ohara glass) having a thickness of about 260 µm was used.

Comparative Example 4

Preparation of Porous Polypropylene (PP) Membrane

A porous polypropylene membrane (Celgard, LLC) having a thickness of about 25 µm was used.

Manufacture Example 1

Preparation of Lithium Symmetric Cell

About 1.38 g of polyethylene oxide powder (weight-average molecular weight of about 100,000, Aldrich) and about 0.9 g of Li(CF$_3$SO$_2$)$_2$N (LiTFSI, Wako) were dispersed in about 100 ml of an acetonitrile (AN) solvent, and the dispersed solution thus obtained was stirred for about 24 hours to prepare a composition for forming an electrolyte.

The stirred composition for forming an electrolyte was cast on a Teflon dish and then dried at about 20° C. for about 24 hours to remove the AN solvent. Then, the Teflon dish was dried at 60° C. for about 12 hours in vacuum to obtain a PEO$_{10}$LiTFSI polymer electrolyte (hereinafter, referred to as "PEO polymer electrolyte"). An average thickness of the polymer electrolyte was about 60 μm.

A battery structure (lithium metal/PEO polymer electrolyte/PVA-LTAP composite membrane/PEO polymer electrolyte/lithium metal) was formed by disposing lithium metal on one side of the PEO polymer electrolyte (weight-average molecular weight: about 1×10$^5$), stacking the composite membrane of Example 1 on the other side of the PEO polymer electrolyte, and stacking a PEO polymer electrolyte on the composite membrane of Example 1.

Manufacture Examples 2 to 11

Preparation of Lithium Symmetric Cells

Lithium symmetric cells were prepared in the same manner as in Manufacture Example 1 except that the composite membranes of Examples 2 to 11 were respectively used instead of the composite membrane of Example 1.

Manufacture Example 12

Preparation of Lithium Air Battery

Lithium metal was disposed on one side of a PEO polymer electrolyte (weight-average molecular weight: about 1×10$^5$), and a polyethylene (PE) separator (Celgard 2400, Hoechst Celanese Corp.) was stacked on the other side of the PEO polymer electrolyte.

The composite membrane (DU-IBLTAP) of Example 1 was stacked on the PE separator and a PEO polymer electrolyte was stacked on the composite membrane of Example 1.

A cathode was disposed on a side of the PEO polymer electrolyte stacked on the composite membrane. The cathode was prepared by mixing about 1 part by weight of carbon aerogels (ENEN) with about 6 parts by weight of the PEO polymer electrolyte. Then, a battery structure was obtained by disposing a gas diffusion layer (GDL) on a side of the cathode.

A lithium air battery was prepared by forming a nickel electrode on the battery structure obtained according to the above-described processes.

Comparative Manufacture Example 1

Preparation of Lithium Symmetric Cell

A lithium symmetric cell was prepared in the same manner as in Manufacture Example 1 except that the membrane of Comparative Example 1 was used instead of the composite membrane of Example 1.

Comparative Manufacture Examples 2 to 4

Preparation of Lithium Symmetric Cells

Lithium symmetric cells were prepared in the same manner as in Manufacture Example 1 except that the membranes of Comparative Examples 2 to 4 were respectively used instead of the composite membrane of Example 1.

Evaluation Example 1

Scanning Electron Microscope (SEM)

1) SEM Analysis of Examples 1 and 2 and Comparative Example 1

The composite membranes prepared according to Examples 1 and 2 and Comparative Example 1 were analyzed by using a scanning electron microscope. Herein, SNE-4500M/MCM-100 (SEC Co., Ltd.) was used as the SEM.

Figure 4A:
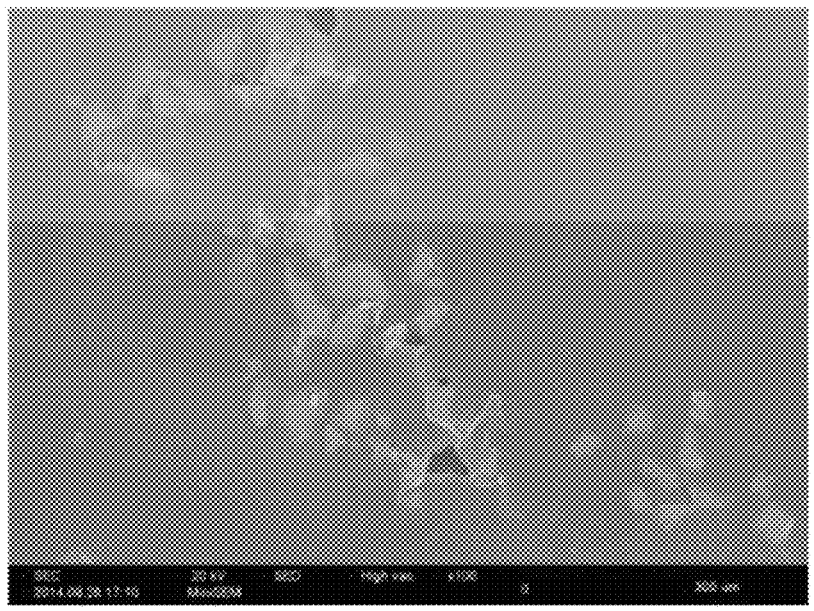
FIGS. 4A and 4B are scanning electron microscope (SEM) micrographs of a top surface and a bottom surface, respectively, of a composite membrane prepared according to Example 1.
Figure 4B:
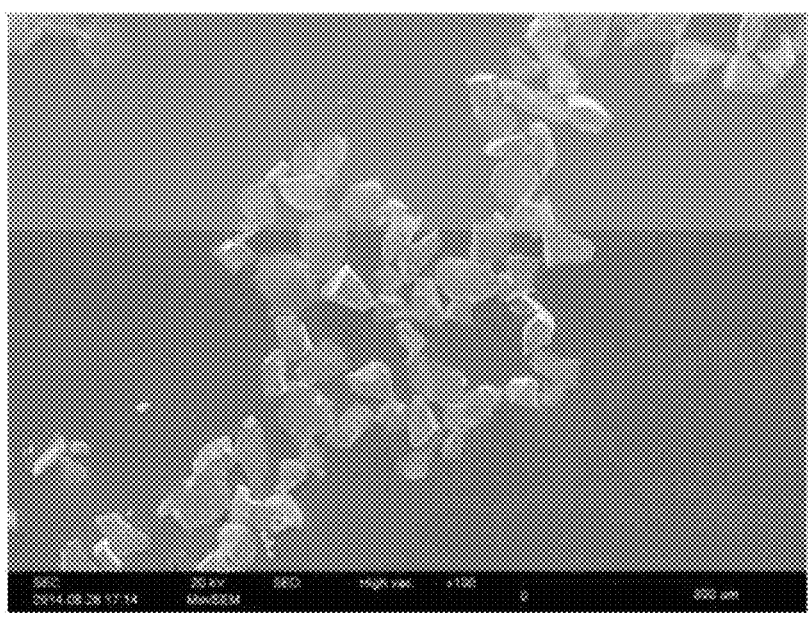
Figure 5A:
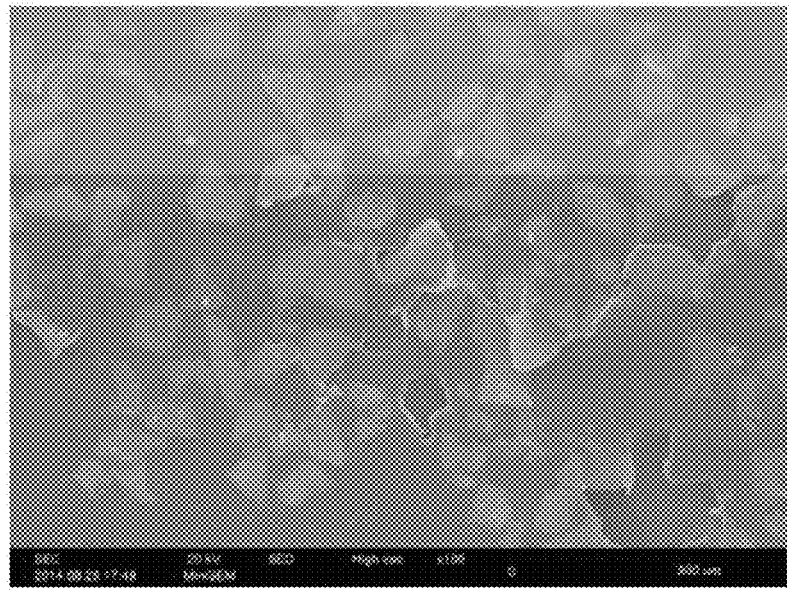
FIGS. 5A and 5B are SEM micrographs of a top surface and a bottom surface, respectively, of a composite membrane prepared according to Example 2.
Figure 5B:
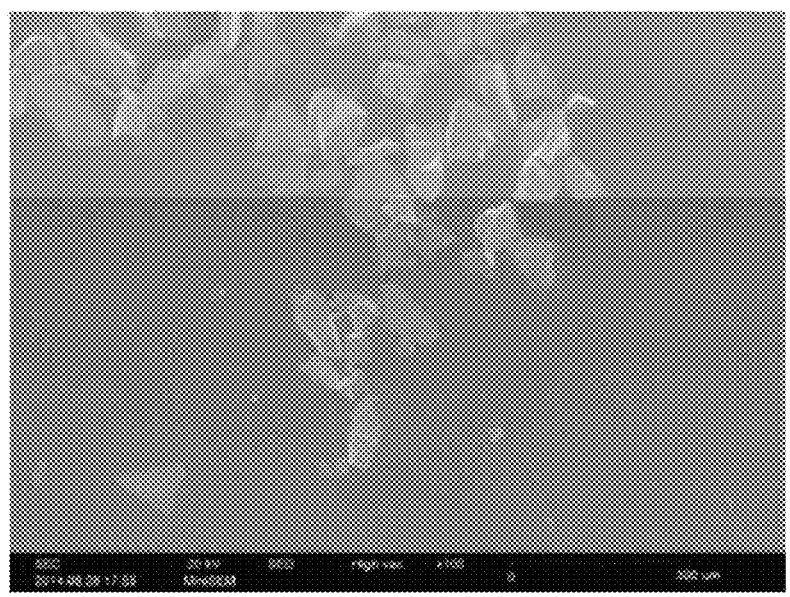

SEM micrographs of a top surface and a bottom surface of the composite membrane prepared according to Example 1 are respectively illustrated in FIGS. 4A and 4B, and SEM micrographs of a top surface and a bottom surface of the composite membrane prepared according to Example 2 are respectively illustrated in FIGS. 5A and 5B. SEM micrographs of a top surface and a bottom surface of the composite membrane prepared according to Comparative Example 1 are respectively illustrated in FIGS. 6A and 6B.

As illustrated in FIGS. 4A, 4B, 5A, and 5B, LTAP particles were observed in all of the top and bottom surfaces of the composite membranes prepared according to Examples 1 and 2. Thus, it may be clearly confirmed that the composite membranes had a structure in which LTAP particles were exposed on the both surfaces of the composite membranes.

Figure 6A:
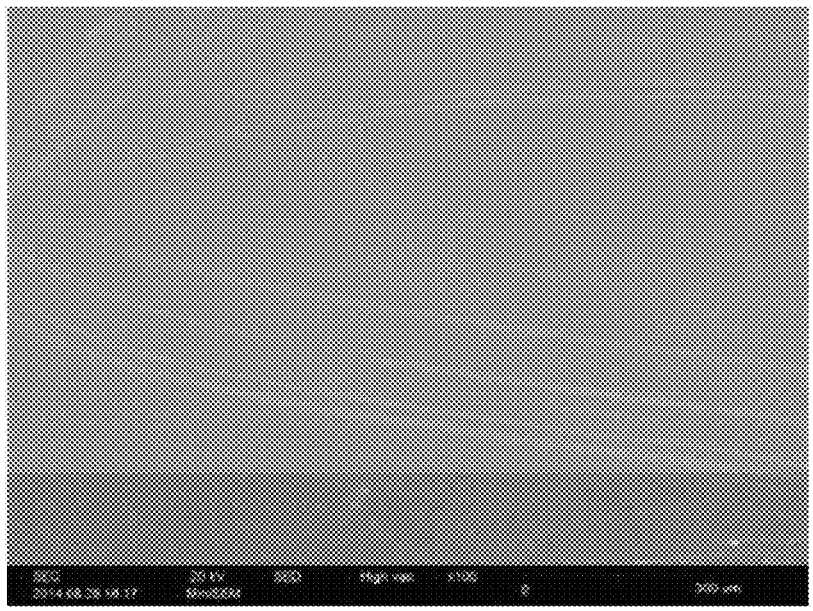
FIGS. 6A and 6B are SEM micrographs of a top surface and a bottom surface, respectively, of a composite membrane prepared according to Comparative Example 1.
Figure 6B:
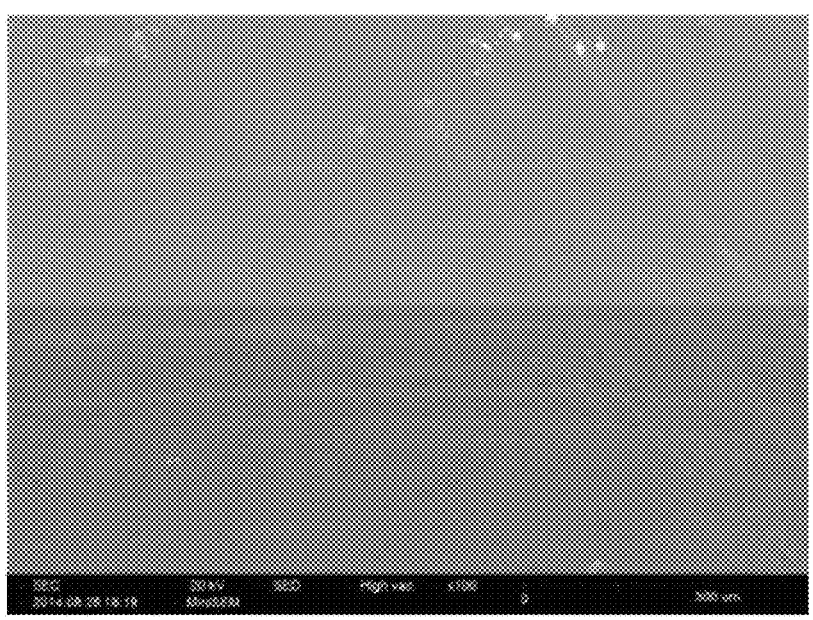

In contrast, LTAP particles were not observed in the top and bottom surfaces of the composite membrane prepared according to Comparative Example 1 as illustrated in FIGS. 6A and 6B. Thus, it may be understood that the composite membrane of Comparative Example 1, different from the composite membranes prepared according to Examples 1 and 2, did not have a structure in which LTAP particles were exposed on the surfaces thereof. The reason for this is that since the LTAP particles were not surface modified, a polymer layer formed from DU was formed on the top surfaces of the LTAP particles during the preparation of the composite membrane.

Evaluation Example 2

Optical Microscope Analysis

The composite membrane prepared according to Example 2 was analyzed by using an optical microscope. Nikon Eclipse LV100D was used as the optical microscope.

Figure 7A:
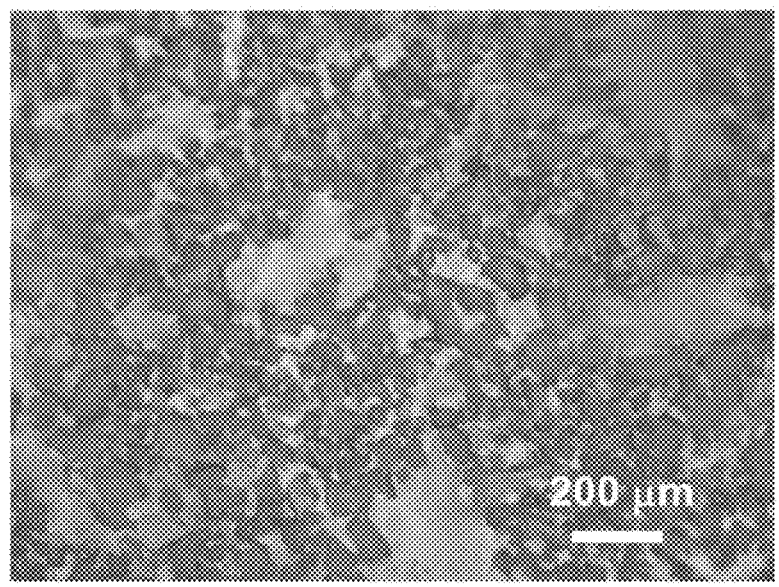
FIGS. 7A and 7B are optical micrographs of a surface of a composite membrane prepared according to Example 2.
Figure 7B:
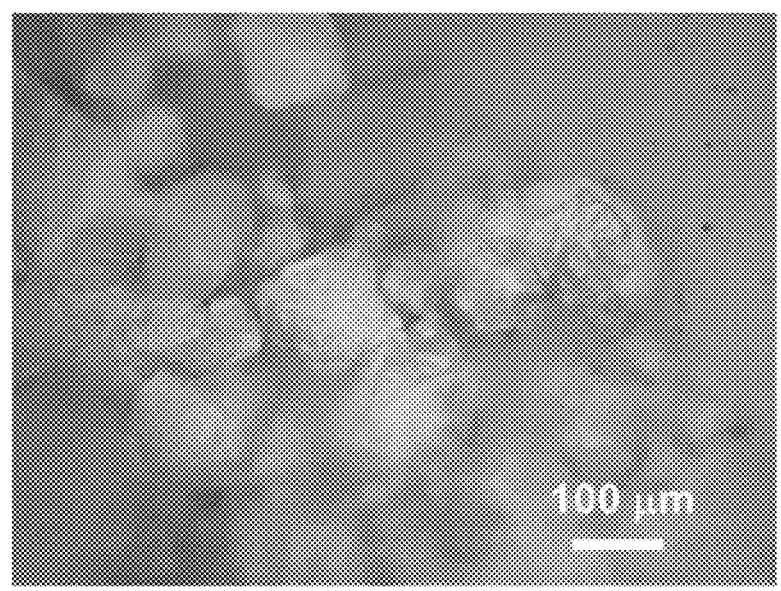

Optical micrographs of the composite membrane prepared according to Example 2 are illustrated in FIGS. 7A and 7B. Referring to FIGS. 7A and 7B, it may be understood that the composite membrane prepared according to Example 2 was in a state in which polymer and LTAP particles were uniformly dispersed.

Evaluation Example 3

Resistance and Impedance Measurements

1) Examples 1 and 2 and Comparative Examples 2 and 3

Structures were prepared by stacking a gold (Au) layer on both surfaces of the composite membranes prepared according to Examples 1 and 2, the $PEO_{10}LiTFSI$ polymer electrolyte prepared according to Comparative Example 2, and the LTAP membrane prepared according to Comparative Example 3. Resistances of the structures were measured.

Figure 8:
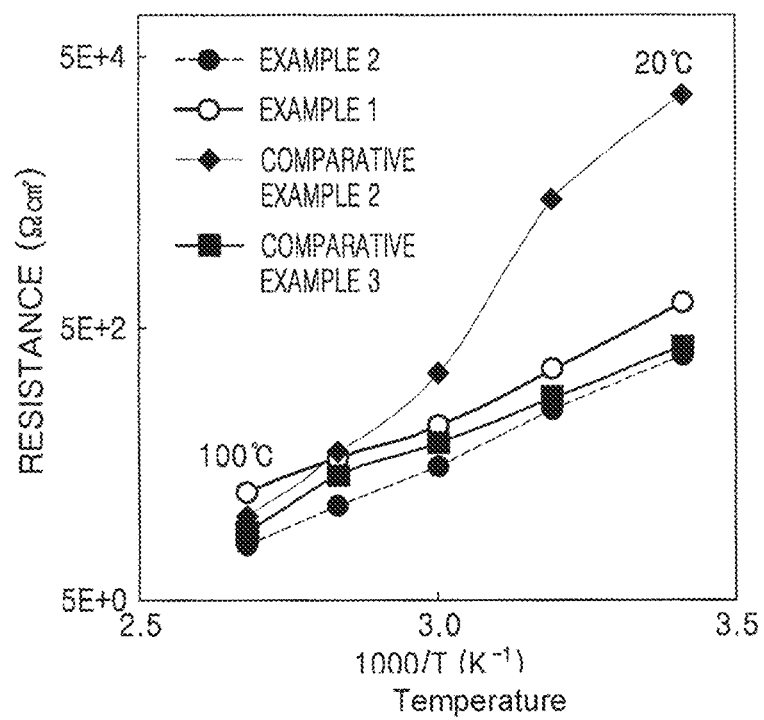
FIG. 8 is a graph of resistance (ohms-square centimeters, $\Omega cm^2$) versus temperature (1000/T, $K^{-1}$) which illustrates changes in resistance characteristics of composite membranes prepared according to Examples 1 and 2, a $PEO_{10}LiTFSI$ polymer electrolyte prepared according to Comparative Example 2, and a lithium-titanium-aluminum-phosphate (LTAP) membrane prepared according to Comparative Example 3.

The results of measuring the resistances of the structures according to temperature are presented in FIG. 8. Resistances at 60° C. are presented in Table 1 below.

TABLE 1

| Category | Composition | Resistance ($\Omega cm^2$) |
|---|---|---|
| Example 1 | DU-IBLTAP | 97 |
| Example 2 | TA-IBLTAP | 48 |
| Comparative Example 2 | $PEO_{10}LiTFSI$ | 240 |
| Comparative Example 3 | LTAP | 73 |

Referring to Table 1, it may be understood that the composite membrane according to Example 2 had a lower resistance than the polymer electrolyte of Comparative Example 2 and the LTAP membrane of Comparative Example 3. The composite membrane prepared according to Example 1 had a somewhat higher resistance than the LTAP membrane of Comparative Example 3, but had excellent oxygen barrier properties. Thus, there was no difficulty in using the composite membrane of Example 1 in practice.

2) Manufacture Examples 1 and 2

Impedance characteristics of the lithium symmetric cells prepared according to Manufacture Examples 1 and 2 were evaluated.

An impedance analyzer used was Material Mates 7260 by Material Mates. Also, an operation temperature of the cells was maintained at about 60° C., and the results of impedance analyses according to storage time are presented in FIGS. 9A and 9B.

The impedance was evaluated from about 0.1 Hz to about 1,000,000 Hz at an open circuit voltage under the condition of applying an alternating current (AC) voltage of about 5 mV, and each profile is shown as a function of the real part and the imaginary part of the impedance.

Figure 9A:
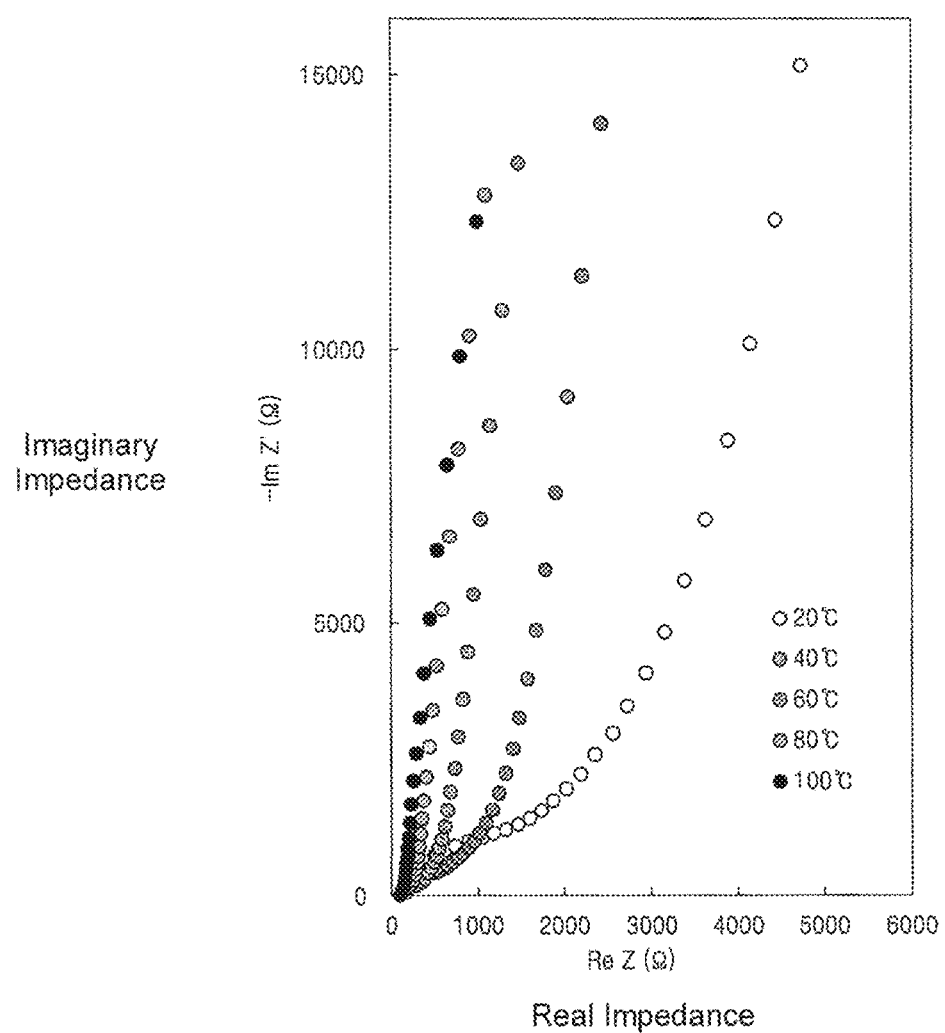
FIGS. 9A and 9B are each a graph of imaginary impedance (Z', $\Omega$) versus real impedance (Z, $\Omega$) which illustrate the impedance characteristics of lithium symmetric cells prepared according to Manufacture Examples 1 and 2, respectively.
Figure 9B:
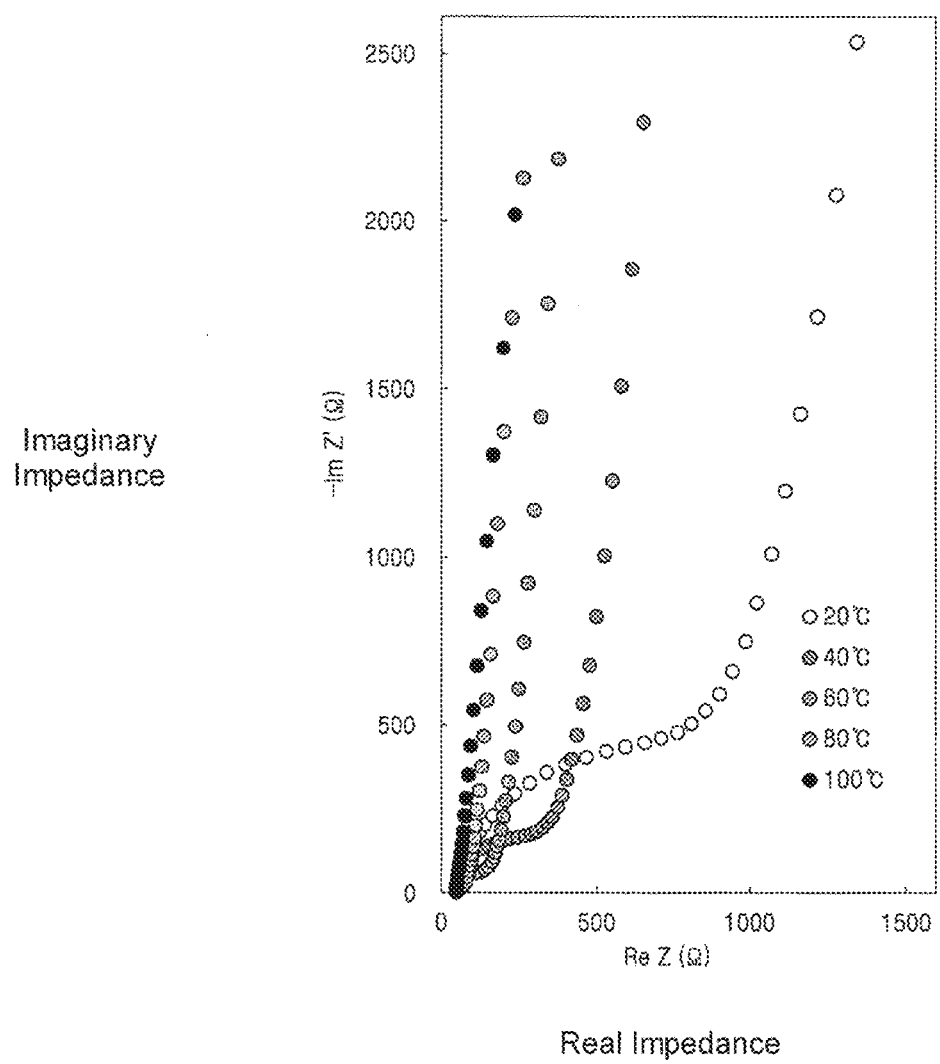

Referring to FIGS. 9A and 9B, it may be understood that the impedance characteristics of the lithium symmetric cells of Manufacture Examples 1 and 2 were excellent.

Evaluation Example 4

Transmission Rate of $O_2$ (OTR) Analysis

Oxygen transmission rates (OTR) of the composite membranes prepared according to Examples 1 and 2, the $PEO_{10}LiTFSI$ polymer electrolyte prepared according to Comparative Example 2, the LTAP membrane prepared according to Comparative Example 3, and the porous PP membrane prepared according to Comparative Example 4 were evaluated according to the following method.

MOCON OX-TRAN 2/21 ML was used as an oxygen transmission rate tester, and oxygen transmission tests were performed using disc samples having an area of about 1 cm².

The evaluation results of the oxygen transmission rate are presented in Table 2 below.

TABLE 2

| Category | Composition | OTR ($cm^3/m^2$ day) |
|---|---|---|
| Example 1 | DU-IBLTAP | 93 |
| Example 2 | TA-IBLTAP | 1070 |
| Comparative Example 2 | $PEO_{10}LiTFSI$ | $1 \times 10^4$ or more (over flow) |
| Comparative Example 3 | LTAP | 8 |
| Comparative Example 4 | Porous PP membrane | $1 \times 10^4$ or more (over flow) |

As illustrated in Table 2, since the composite membranes prepared according to Examples 1 and 2 each had a lower OTR than the $PEO_{10}LiTFSI$ polymer electrolyte prepared according to Comparative Example 2 and the porous PP membrane prepared according to Comparative Example 4, it may be understood that oxygen barrier properties of the composite membranes prepared according to Examples 1 and 2 were excellent. For reference, it was found that the LTAP membrane prepared according to Comparative Example 3, as an inorganic membrane, exhibited excellent oxygen barrier properties.

Evaluation Example 5

Charge and Discharge Characteristics and Cycle Characteristics of Lithium Air Battery The lithium air battery according to Manufacture Example 12 was discharged in a constant current (CC) mode at a current density of about 0.48 mA/cm², and charged in the CC mode at a current density of about 0.48 mA/cm² and in a constant voltage (CV) mode at a voltage of about 4.0 V under oxygen pressure of about 1 atm in a chamber.

The battery exhibited a cathode discharge capacity of about 250 mAh/g per unit mass of carbon.

Figure 10:
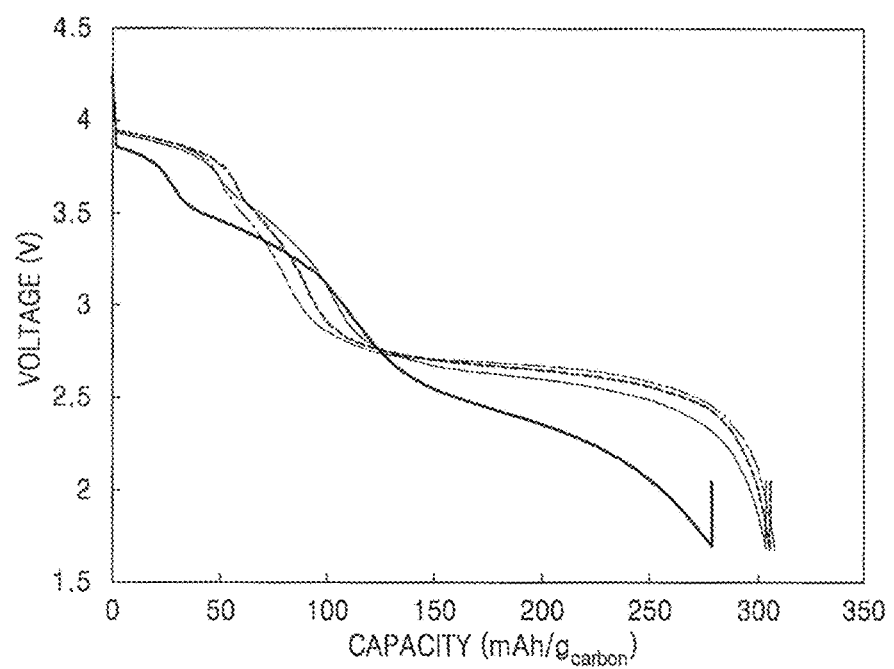
FIG. 10 is a graph of voltage (volts, V) versus capacity (milliampere hours per gram carbon, $mAh/g_{carbon}$) which illustrates changes in voltage versus capacity in a lithium air battery prepared according to Manufacture Example 12.

After charge and discharge cycles were repeated, changes in voltage according to capacity were investigated, and the results thereof are presented in FIG. 10.

Referring to FIG. 10, it may be understood that the lithium air battery of Manufacture Example 12 had stable charge and discharge characteristics and cycle characteristics.

As described above, according to the one or more of the above exemplary embodiments, a composite membrane able to be lightweight, formed as a thin film as well as having excellent gas and moisture barrier properties, and improved ionic conductivity may be provided. A lithium secondary battery having improved specific capacity and lifetime may be prepared when the composite membrane is used.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite membrane comprising:
an organic layer having a plurality of through holes; and
ion conductive inorganic particles disposed in the through holes,
wherein a hydrophobic coating layer is disposed on a surface of the ion conductive inorganic particles and the hydrophobic coating layer comprises at least one condensation reaction product,
wherein an amount of the at least one condensation reaction product is in a range of about 0.1 part by weight to about 30 parts by weight, based on 100 parts by weight of the ion conductive inorganic particles, and
wherein the ion conductive inorganic particles are single-body particles, and each single-body particle has a first surface exposed at a top surface of the composite membrane and a second surface exposed at a bottom surface of the composite membrane.

2. The composite membrane of claim 1, wherein the surface of the ion conductive inorganic particles on which the hydrophobic coating layer is disposed faces a surface of the organic layer.

3. The composite membrane of claim 1, wherein the composite membrane comprises a sea-island structure in which the ion conductive inorganic particles are discontinuously disposed in the organic layer.

4. The composite membrane of claim 1, wherein a cross section of the composite membrane comprises a structure in which the organic layer and the ion conductive inorganic particles are alternately aligned.

5. The composite membrane of claim 1, wherein the ion conductive inorganic particles disposed in the organic layer are disposed in the form of a monolayer.

6. The composite membrane of claim 1, wherein the organic layer comprises at least one selected from a homopolymer, a block copolymer, and a random copolymer.

7. The composite membrane of claim 1, wherein the hydrophobic coating layer comprises at least one condensation reaction product of one selected from compounds represented by Formula 1:

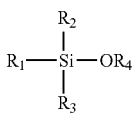

Formula 1 wherein, in Formula 1, $R_1$ to $R_3$ each independently represent a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_2$-$C_{20}$ heterocyclic group, or a halogen atom, and
$R_4$ represents hydrogen, a substituted or unsubstituted $C_1$-$C_{20}$ alkyl group, or a substituted or unsubstituted $C_6$-$C_{20}$ aryl group.

8. The composite membrane of claim 7, wherein the compound represented by Formula 1 comprises at least one selected from isobutyltrimethoxysilane, octyltrimethoxysilane, propyltrimethoxysilane, decyltrimethoxysilane, dodecyltrimethoxysilane, octadecyltrimethoxysilane, 3-methacryloxypropyltrimethoxysilane, n-octadecyltriethoxysilane, 1H,1H,2H,2H-perfluorooctyltriethoxysilane, and (3-mercaptopropyl)trimethoxysilane.

9. The composite membrane of claim 7, wherein an amount of the at least one condensation reaction product of one selected from compounds represented by Formula 1 is in a range of about 0.1 part by weight to about 5 parts by weight, based on 100 parts by weight of the ion conductive inorganic particles.

10. The composite membrane of claim 1, wherein the single-body particles are without grain boundaries.

11. The composite membrane of claim 1, wherein an amount of the ion conductive inorganic particles is in a range of about 10 parts by weight to about 90 parts by weight, based on 100 parts by weight of a total weight of the composite membrane.

12. The composite membrane of claim 1, wherein the ion conductive inorganic particles comprise at least one selected from a glassy active metal ion conductor, an amorphous active metal ion conductor, a ceramic active metal ion conductor, and a glass-ceramic active metal ion conductor.

13. The composite membrane of claim 1, wherein the ion conductive inorganic particles comprise at least one selected from $Li_{1+x+y}Al_xTi_{2-x}Si_yP_{3-y}O_{12}$ wherein 0<x<2, 0<y<3, $BaTiO_3$, $Pb(Zr_xTi_{1-x})O_3$ wherein 0≤x≤2, $Pb_{1-x}La_xZr_{1-y}Ti_yO_3$ wherein in 0≤x<1 and 0≤y<1, $Pb(Mg_3Nb_{2/3})O_3$-$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ wherein 0<x<2 and 0<y<3 ), $Li_xAl_yTi_z(PO_4)_3$ wherein 0<x<2, 0<y<1, and 0<z<3, $Li_{1+x+y}(Al_qGa_{1-q})_x(Ti_rGe_{1-r})_{2-x}Si_yP_{3-y}O_{12}$ wherein 0<x<1, 0<y<1, 0<q<1, and 0<r<1), $Li_xLa_yTiO_3$ wherein 0<x<2 and 0<y<3, $Li_xGe_yP_zS_w$, wherein 0<x<4, 0<y<1, 0<z<1, and 0<w<5, $Li_xN_y$ wherein 0<x<4 and 0<y<2, $SiS_2(Li_xSi_yS_z)$ wherein 0<x<3, 0<y<2, and 0<z<4, a $P_2S_5(Li_xP_yS_z)$ glass wherein 0<x<3, 0<y<3, 0<z<7, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, a garnet ceramic, and $Li_{3+x}La_3M_2O_{12}$ where M is at least one selected from Te, Nb, and Zr.

14. The composite membrane of claim 1, wherein the ion conductive inorganic particles comprise $Li_{1.4}Ti_{1.6}Al_{0.4}P_3O_{12}$ or a $Li_2O$—$Al_2O_3$—$SiO_2$—$P_2O_5$—$TiO_2$—$GeO_2$ ceramic.

15. The composite membrane of claim 1, wherein the organic layer comprises a polymer having a gas permeability of about $10^{-3}$ cm$^3$/m$^2$ day to about 1,000 cm$^3$/m$^2$ day, based on a permeability of at least one selected from oxygen, carbon dioxide, and water vapor.

16. The composite membrane of claim 1, wherein the organic layer comprises a polymerization product of a polymerizable non-aqueous floating compound, or a polymerization product of a polymerizable non-aqueous floating compound and a polythiol having 3 or 4 thiol groups.

17. The composite membrane of claim 1, wherein the organic layer comprises:
(i) a polymerization product of at least one multifunctional monomer selected from a multifunctional acryl monomers and a multifunctional vinyl monomers, or
(ii) a polymerization product of a polythiol having 3 or 4 thiol groups and at least one multifunctional monomer selected from a multifunctional acryl monomer and a multifunctional vinyl monomer.

18. The composite membrane of claim 17, wherein the multifunctional monomer comprises at least one selected from diurethane dimethacrylate, trimethylolpropane triacrylate, diurethane diacrylate, trimethylolpropane trimethacrylate, neopentyl glycol diacrylate, 3'-acryloxy-2',2'-dimethylpropyl 3-acryloxy-2,2-dimethylpropionate, bisphenol A diacrylate, and 1,3, 5,-triallyl-1,3,5-triazine-2,4,6-trione.

19. The composite membrane of claim 17, wherein the polythiol comprises at least one selected from pentaerythritol tetrakis(3-mercaptopropionate), trimethylolpropane tris (3-mercaptopropionate), 4-mercaptomethyl-3,6-dithia-1,8-octanedithiol, pentaerythritol tetrakis(2-mercaptoacetate), and trimethylolpropane tris(2-mercaptoacetate).

20. The composite membrane of claim 1, wherein an average particle diameter of the ion conductive inorganic particles is in a range of about 1 micrometer to about 300 micrometers.

21. The composite membrane of claim 1, wherein a gas permeability of the composite membrane is in a range of about $10^{-3}$ $cm^3/m^2$ day to about 1,000 $cm^3/m^2$ day.

22. The composite membrane of claim 1, wherein an exposed area of the ion conductive inorganic particles is in a range of about 30 percent to about 80 percent, based on a total area of the composite membrane.

23. The composite membrane of claim 1, wherein a thickness of the hydrophobic coating layer is in a range of about 1 nanometer to about 100 nanometers.

24. An anode structure comprising:
an anode; and
the composite membrane of claim 1.

25. A lithium secondary battery comprising the anode structure of claim 24.

26. A lithium air battery comprising the anode structure of claim 24.

27. A composite membrane comprising:
an organic layer having a plurality of through holes; and
ion conductive inorganic particles disposed in the through holes,
wherein a hydrophobic coating layer is disposed on a surface of the ion conductive inorganic particles,
wherein the organic layer comprises:
(i) a polymerization product of at least one multifunctional monomer selected from a multifunctional acryl monomer and a multifunctional vinyl monomer, or
(ii) a polymerization product of a polythiol having 3 or 4 thiol groups and at least one multifunctional monomer selected from a multifunctional acryl monomer and a multifunctional vinyl monomer,
wherein the multifunctional monomer comprises diurethane dimethacrylate, trimethylolpropane triacrylate, diurethane diacrylate, trimethylolpropane trimethacrylate, neopentyl glycol diacrylate, 3'-acryloxy-2',2'-dimethylpropyl 3-acryloxy-2,2-dimethylpropionate, bisphenol A diacrylate, 1,3,5,-triallyl-1,3,5-triazine-2,4,6-trione, or a combination thereof.

28. A method of preparing the composite membrane of claim 1, the method comprising:
(1) floating ion conductive inorganic particles having a hydrophobic coating layer disposed on a surface thereof and a mixture including a polymerizable non-aqueous floating compound and a solvent on water to form a first system;
(2) stirring the first system to form a second system;
(3) removing the solvent from the second system to form a third system;
(4) polymerizing the third system to form the composite membrane; and,
(5) resulting in the composite membrane of claim 1.

29. The method of claim 28, wherein the stirring comprises performing air blowing.

30. The method of claim 28, wherein the floating the ion conductive inorganic particles comprises:
first float casting to float a first portion of the polymerizable non-aqueous floating compound and the solvent on the water;
second float casting to float the ion conductive inorganic particles on the water by contacting the ion conductive inorganic particles having a hydrophobic coating layer disposed on a surface thereof to the water having the polymerizable non-aqueous floating compound and the solvent thereon; and
third float casting to float a second portion of the polymerizable non-aqueous floating compound and the solvent on the water by contacting the second portion to the product of the second float casting.

31. The method of claim 28, wherein the polymerizable non-aqueous floating compound comprises i) a mixture of a polythiol having 3 or 4 thiol groups and at least one multifunctional monomer selected from a multifunctional acryl monomer and a multifunctional vinyl monomer, or ii) a multifunctional monomer selected from a multifunctional acryl monomer and a multifunctional vinyl monomer.

32. The method of claim 28, wherein the ion conductive inorganic particles having a hydrophobic coating layer disposed on at least one surface thereof are prepared by:
contacting ion conductive inorganic particles and a compound represented by Formula 1 to form a reaction product;
washing the reaction product; and drying the reaction product:

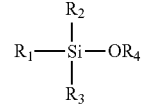

Formula 1 wherein, in Formula 1, $R_1$ to $R_3$ are each independently selected from a substituted or unsubstituted $C_1$-$C_{20}$ alkyl group, a substituted or unsubstituted $C_1$ -$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_3$-$C_{20}$ heteroarylalkyl group, a substituted or unsubstituted $C_2$-$C_{20}$ heterocyclic group, and a halogen atom, and
$R_4$ is selected from hydrogen, a substituted or unsubstituted $C_1$-$C_{20}$ alkyl group, and a substituted or unsubstituted $C_6$-$C_{20}$ aryl group.

33. The method of claim 28, further comprising grinding and sieving the ion conductive inorganic particles to provide an average particle diameter of the ion conductive inorganic particles of about 1 micrometer to about 300 micrometers.

34. The method of claim 28, wherein the removing of the solvent from the second system to form the third system is performed in a temperature range of about 25° C. to about 60° C.

35. The method of claim 28, wherein an amount of the polymerizable non-aqueous floating compound is in a range of about 10 parts by weight to about 1,000 parts by weight, based on 100 parts by weight of the ion conductive inorganic particles having the hydrophobic coating layer disposed on a surface thereof.

* * * * *